(12) United States Patent
Xin et al.

(10) Patent No.: US 10,713,327 B2
(45) Date of Patent: Jul. 14, 2020

(54) GEO-BASED DATA PROVISION, SEARCH AND ACCESS SYSTEM AND METHODS

(71) Applicants: Alfred X. Xin, Cincinnati, OH (US); Sherry X. Sun, Cincinnati, OH (US)

(72) Inventors: Alfred X. Xin, Cincinnati, OH (US); Sherry X. Sun, Cincinnati, OH (US)

(*) Notice: Subject to any disclaimer, the term of this patent is extended or adjusted under 35 U.S.C. 154(b) by 0 days.

(21) Appl. No.: 16/600,482

(22) Filed: Oct. 12, 2019

(65) Prior Publication Data

US 2020/0042566 A1 Feb. 6, 2020

Related U.S. Application Data

(63) Continuation-in-part of application No. 15/710,955, filed on Sep. 21, 2017, now abandoned, which is a
(Continued)

(51) Int. Cl.
*G06F 16/9537* (2019.01)
*G06Q 30/02* (2012.01)
(Continued)

(52) U.S. Cl.
CPC ........ *G06F 16/9537* (2019.01); *G06F 3/0481* (2013.01); *G06F 3/0484* (2013.01); *G06Q 30/0257* (2013.01); *G06Q 30/0259* (2013.01); *G06Q 30/0261* (2013.01); *G06Q 30/0267* (2013.01); *G06Q 30/0277* (2013.01);
(Continued)

(58) Field of Classification Search
CPC ....... H04W 4/02; H04W 4/023; H04W 4/021; H04W 4/025; H04W 64/003; H04W 4/008; H04W 4/14; H04W 4/18; H04W 4/206; H04W 4/029; H04W 4/80; H04W 12/06; H04W 12/0608; G06F 16/9537; G06F 3/0481; G06F 3/0484; G06Q 30/0257; G06Q 30/0259; G06Q 30/0261; G06Q 30/0267; G06Q 30/0277; H04L 63/0876; H04L 63/083
See application file for complete search history.

(56) References Cited

U.S. PATENT DOCUMENTS 9,544,075 B2 * 1/2017 Altman ................ H04H 60/90
10,360,593 B2 * 7/2019 Hunter ................. H04W 4/023
(Continued)

*Primary Examiner* — Magdi Elhag

(57) ABSTRACT

Method and system consist of a mobile application installed on a mobile device with internet connection and a geographical positioning device; a remote hosting server configured with software and database; an onsite wireless communication hosting apparatus. The mobile application communicates with the remote hosting server and the onsite wireless communication apparatus. The remote hosting server and onsite wireless communication apparatus communicate and transfer data to one another, the remote hosting server communicates with third party databases via secured access and retrieves location related information requested by onsite users of the mobile device. Web users at anywhere may select a location displayed on a digital map over interface of a web application configured to the remote hosting server; access the same as onsite users; including data entered by location owners, received from third-party databases via secured connection, and uploaded from onsite wireless communication apparatus.

28 Claims, 23 Drawing Sheets

Related U.S. Application Data continuation-in-part of application No. 14/752,993, filed on Jun. 28, 2015, now abandoned, which is a continuation of application No. 14/665,791, filed on Mar. 23, 2015, now abandoned, which is a continuation of application No. 14/630,212, filed on Feb. 24, 2015, now abandoned, which is a continuation of application No. 14/599,459, filed on Jan. 17, 2015, now abandoned, which is a continuation of application No. 14/566,116, filed on Dec. 10, 2014, now abandoned.

(51) Int. Cl.

| | | |
|---|---|---|
| *H04W 4/80* | (2018.01) | |
| *H04W 12/06* | (2009.01) | |
| *H04W 4/021* | (2018.01) | |
| *H04L 29/06* | (2006.01) | |
| *H04L 29/08* | (2006.01) | |
| *H04W 4/18* | (2009.01) | |
| *G06F 3/0484* | (2013.01) | |
| *G06F 3/0481* | (2013.01) | |
| *H04W 4/21* | (2018.01) | |
| *H04N 21/422* | (2011.01) | |

(52) U.S. Cl.
CPC ............ *H04L 67/20* (2013.01); *H04W 4/021* (2013.01); *H04W 4/18* (2013.01); *H04W 4/21* (2018.02); *H04N 21/42202* (2013.01)

(56) References Cited

U.S. PATENT DOCUMENTS

| | | | | |
|---|---|---|---|---|
| 2002/0164999 | A1* | 11/2002 | Johnson | H04W 4/029 455/456.1 |
| 2007/0143283 | A1* | 6/2007 | Spencer | G06F 16/951 |
| 2009/0076912 | A1* | 3/2009 | Rajan | G06Q 30/02 705/14.64 |
| 2009/0141130 | A1* | 6/2009 | Ortiz | H04N 5/232 348/159 |
| 2009/0325595 | A1* | 12/2009 | Farris | H04W 4/021 455/456.1 |
| 2009/0325606 | A1* | 12/2009 | Farris | H04L 67/16 455/456.3 |
| 2013/0210461 | A1* | 8/2013 | Moldavsky | G06Q 30/0261 455/456.3 |
| 2013/0303192 | A1* | 11/2013 | Louboutin | G06Q 30/0261 455/456.3 |
| 2013/0337839 | A1* | 12/2013 | Hayes | H04W 4/025 455/456.3 |
| 2013/0339270 | A1* | 12/2013 | Singh | G06Q 30/0281 705/346 |
| 2014/0215330 | A1* | 7/2014 | Lee | G09B 29/007 715/703 |
| 2014/0273920 | A1* | 9/2014 | Smith | H04W 4/029 455/404.2 |
| 2014/0357306 | A1* | 12/2014 | Shie | H04W 64/00 455/457 |
| 2015/0058409 | A1* | 2/2015 | Wang | H04L 67/06 709/203 |
| 2015/0080032 | A1* | 3/2015 | Moldavsky | G06Q 30/0261 455/456.3 |
| 2015/0163623 | A1* | 6/2015 | Kosseifi | H04W 4/021 455/456.3 |
| 2015/0237463 | A1* | 8/2015 | Stuttle | G01S 5/0252 455/456.3 |
| 2015/0312725 | A1* | 10/2015 | Torii | H04H 60/09 455/456.1 |
| 2015/0365750 | A1* | 12/2015 | Sun | G06F 3/167 381/122 |
| 2016/0037299 | A1* | 2/2016 | Fisher | H04W 64/003 455/456.3 |
| 2016/0119749 | A1* | 4/2016 | Moldavsky | H04W 4/025 455/456.3 |
| 2016/0292771 | A1* | 10/2016 | Afzelius | G06Q 30/0633 |

* cited by examiner www.forthisapplicationonly.com/dining

Watch video on Today's Specials Again?
Click links here

Alaska Jumbo Shrimp Scampi

Stone Grilled Kobe Steak Marinated with Sapporo Beer

See Our Menu

Watch Cooking Lessons

Make Reservation

Leave Comments

Contact Us

GEO-BASED DATA PROVISION, SEARCH AND ACCESS SYSTEM AND METHODS

CROSS-REFERENCE TO RELATED APPLICATION

This application is a continuation-in-part of and claims the benefit of U.S. patent application Ser. No. 15/710,995, application Ser. No. 14/752,993, U.S. patent application Ser. No. 14/599,459, U.S. patent application Ser. No. 14/630,212, U.S. patent application Ser. No. 14/665,791, and U.S. patent application Ser. No. 14/566,116, the entireties of which are incorporated herein by reference.

FIELD OF THE INVENTION

The present disclosure generally relates to systems, devices, and methods for targeted and location based communications for user devices, location based devices and web application.

BACKGROUND OF THE INVENTION

Mobile device users go to visit places such as a business, a facility or an entity with a range of functions and capacities may not he aware of all the information, services, or accurate places of products and live or recorded information or programs provided in, at or close to those places. Therefore there is a need to provide them with automated system, and mobile users of the system don't have to do anything to have it activated and the system will show them what are offered at those places on popup windows when users are within an approximate range of a location; the system would automatically alert them and automatically displays static or live information and or performs multimedia programs, including but not limited to live or pre-recorded audio, and or visual programs. Web users at anywhere may select a location displayed on a digital map over interface of a web application configured to the remote hosting server; access information and multimedia programs as onsite users; including data entered by location owners and users of the locations, and collected from other data resources or received from third party database, sent and uploaded from a website of the system or from an onsite wireless communication apparatus. Said onsite communication apparatus directly broadcasts and communicates with mobile software application of the system within a short range and with or without internet or mobile network signals. Users of the system may also communicate with one another or user groups via social media features and functions provided by the system.

SUMMARY OF THE INVENTION

An onsite automated information search and multimedia method and system comprises of a mobile software application installed on a mobile device with internet connection and a geographical positioning device; a remote server and database, web applications for web users of the system and for location owners to upload information, and Onsite Wireless Communication Apparatus (OWCA); the remote server comprises a storage media for the user, and provides, independent of the onsite wireless communication apparatus, at least one of a website or downloadable software, and operatively allows the user to enter, upload and update location media contents data, and download and update software of the system. The onsite wireless communication apparatus may be configured to provide functions and feature for users to generate, create information, multimedia programs in a plurality of data formats via a graphical user interface, and store information and multimedia programs in the OWCA; publish and broadcast said information and programs in a plurality of data formats; further OWCA may also be configured to transfer data to and receive data from other multimedia devices and broadcasting information and multimedia programs received from other multimedia devices in a plurality of data formats; still further OWCA may be configured to provide features and functions for users of the apparatus to select and sequence information and programs created or loaded on the apparatus for broadcasting. Mobile users installed with mobile application of the system and web users of the system may receive information and programs broadcasted sequentially. Onsite wireless communication apparatus may also communicate to one another either via said remote server or radio signals from one another within a range.

Each onsite wireless communication apparatus or software package with functions of onsite wireless communication apparatus configured and installed on a computing device may be assigned with an unique identification number and an authorization code. When mobile users installed with mobile software application of the system within an approximate range of an onsite wireless communication apparatus and the mobile application receives an identification code and or an authorization code from the apparatus. If internet and mobile signals are available, the mobile software application forwards the identification to the remote database server of the system, and the remote database server checks the identification code against its database, once found, it sends approval signal to the mobile application, and the mobile application starts to receive programs broadcasted from the on site wireless communication apparatus; if internet and or mobile signals are not available or onsite wireless communication apparatus sends signal that an authorization code is required to verify before a mobile device is able to receive its broadcasting, regardless if internet and mobile network signals are available, the mobile application compares the authorization code sent from the onsite wireless communication apparatus to a set of known access codes received from a remote access point or preloaded with the software application, once found, the mobile software application starts to receive programs broadcasted from the onsite wireless communication apparatus.

Once onsite data is accessible said software application may automatically alert said user and display information, play live or recorded multimedia programs from the business, facility or entity. Said remote server and onsite wireless communication apparatus may communicate, transfer and store data to one another. Said remote server and onsite wireless communication apparatus may also communicate and transfer data from a third party database or webserver and forward data to said mobile software application. User of the mobile software application may search specific information within or related to a business, facility or entity.

Users, onsite or online, may search specific information within or related to a business, facility; or listen to and or watch live or recorded programs provided by the business, facility or entity. Information and multimedia programs from a third-party business, a facility or entity may be displayed on window and or played during information, and or live or recorded multimedia programs are shown by said business, facility or entity.

Onsite wireless communication apparatus may also communicate to one another either via said remote server or radio signals from one another within a range; Onsite wireless communication apparatus may be configured to at least one of wireless signal extenders that expand signal-covering areas.

Onsite wireless communication apparatus configured with or connected to multimedia devices as a portable, standalone and plug-and-play communication equipment and a core part of the entire architecture provide benefits for users from all walks of life (businesses, entertainment facilities, schools, small villages, public venues and etc.) with wireless broadcasting means in their localities without having to upload and create information and programs to the internet first or build up a broadcasting tower; purchase and install and configure complicated sets of equipment. With onsite wireless communication apparatus mobile device users may get direct access to live or recorded data in a plurality of formats either having or not having internet connections and cellphone signals; by configuring with a set of wireless routers and or signal extenders, onsite wireless communication apparatus is able to cover desired broadcasting range with a very little costs.

Not only onsite wireless communication apparatus benefits shall benefit in developed communities, regions or countries in terms of new way of broadcasting, it will also benefit underdeveloped and geographically isolated places. It would allow anyone like to have their own wireless communication system without having to build up a radio or TV station; Owners of said onsite wireless communication apparatus don't have to hire system administrators to configure and maintain a network configured with a number of hard and software systems, and there is no more need to make sure that all the hardware and software are compatible to one another; said equipment with assigned unique identification code allow them to connected to remote server and decide if they want to upload created information and or live or recorded programs with a few clicks from menu selections; and communication between the equipment and the remote server enables information published and updated automatically with connections of geographical references without involving in IP address.

Users of the system are able to communicate with one another or groups in a plurality of data formats via social media features and functions provided by web and mobile apps of the system. Communications may be in the forms of sharing photo images and information, live or recorded video and audio. Users may connect to friends for private communications or organize groups sharing information based on common interests or geo-locations.

DESCRIPTION OF THE DRAWINGS

Objects and advantages together with the operation of the present teachings may be better understood by reference to the following detailed description taken in connection with the following illustrations, wherein.

DETAILED DESCRIPTION

Figure 1:
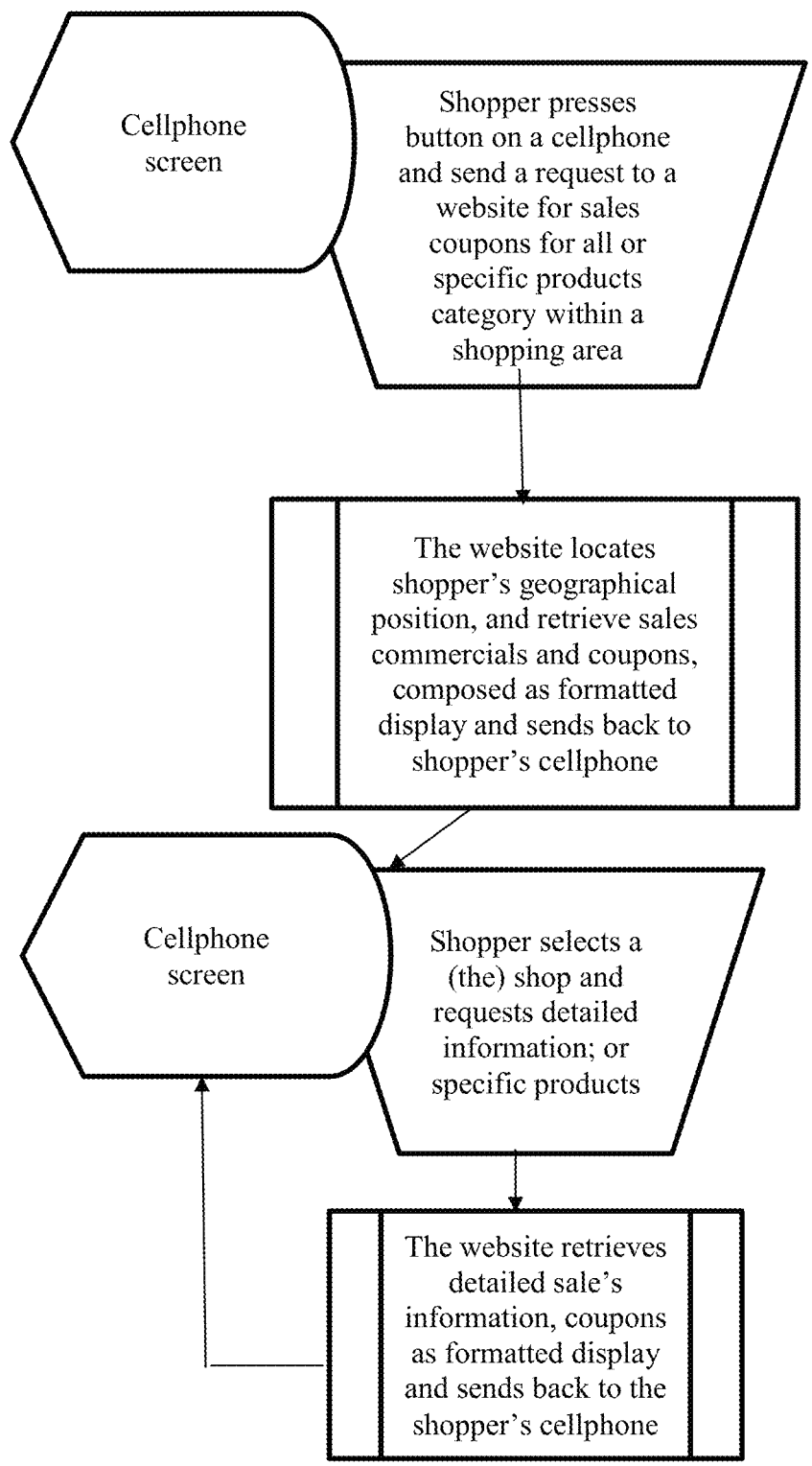
FIG. 1 illustrates a flow chart that demonstrates logical flows of an onsite sales and commercial search method and system between onsite shoppers and a website with sales' commercials and coupons.

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still he within the spirit and scope of the present teachings.

As used herein, the words "example" and "exemplary" mean an instance, or illustration. The words "example" or "exemplary" or terms of similar import do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

The terms "component," "module," "system," "interface," "platform," "service," "framework," "connector," "controller," or the like are generally intended to refer to a computer-related entity. Such terms may refer to at least one of hardware, software, or software in execution. For example, a component may include a computer process running on a processor, a processor, a device, a process, a computer thread, or the like. In another aspect, such terms may include both an application running on a processor and a processor.

Moreover, terms such as "access point," "server," and the likes, are utilized interchangeably, and refer to a network component or appliance that serves and receives control data, voice, video, sound, or other data-stream or signaling-stream. Data and signaling streams may be packetized or frame-based flows. Furthermore, the terms "user," "customer," "consumer," and the like are employed interchangeably throughout the subject specification, unless context suggests otherwise or warrants a particular distinction among the terms. It is noted that such terms may refer to human entities or automated components supported through artificial intelligence (e.g., a capacity to make inference). A network typically includes a plurality of elements that host logic. In packet based wide-area networks (WAN), servers (e.g., devices comprising logic) may be placed at different points on the network. Servers may communicate with other devices and/or databases. In another aspect, a server may provide access to a user account. The "user account" includes attributes for a particular user and commonly include a unique identifier (ID) associated with the user. The ID may be associated with a particular mobile device(s) owned by the user. The user account may also include information such as relationships with other users, application usage, location, personal settings, and other information.

Embodiments may utilize substantially any wired or wireless network. For instance, embodiments may utilize various radio access network (RAN), e.g., Wi-Fi, global system for mobile communications, universal mobile telecommunications systems, worldwide interoperability for microwave access, enhanced general packet radio service, third generation partnership project long-term evolution (4G LIE), 5G networks, third generation partnership project 2, BLUETOOTH®, ultra mobile broadband, high speed packet access, $x^{th}$ generation long-term evolution, or another IEEE 802.XX technology. Furthermore, embodiments may utilize wired communications.

It is noted that, terms "user equipment," "device," "user equipment device," "client," and the like are utilized interchangeably in the subject application, unless context warrants particular distinction(s) among the terms. Such terms may refer to a network. component(s) or appliance(s) that sends or receives data, voice, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include cellular telephones (e.g., smart phones), personal digital assistants (PDAs), portable computers, tablet computers (tablets), hand-held gaming counsels, wearables (e.g., smart watches), desktop computers, etc.

It is noted that user equipment devices can communicate with each other and with other elements via a network, for instance, a wireless network, or a wireline network. A "network" can include broadband wide-area networks such as cellular networks, local area networks, wireless local-area networks (e.g., Wi-Fi), and personal area networks, such as near-field communication networks including BLUETOOTH®). Communication across a network may include packet-based communications, radio and frequency/amplitude modulations networks, and the likes. Communication may be enabled by hardware elements called "transceivers." Transceivers may be configured for specific networks and a user equipment device may have any number of transceivers configured for various networks. For instance, a smart phone may include a cellular transceiver, a Wi-Fi transceiver, a BLUETOOTH® transceiver, or may be hardwired. In those embodiments in which it is hardwired, any appropriate kind or type of networking cables may be utilized. For example, USB cables, dedicated wires, coaxial cables, optical fiber cables, twisted pair cables, Ethernet, HDMI and the like.

In the first embodiment, referencing to drawings, in FIG. 1, FIG. 2, FIG. 12C and FIG. 13 of a preferred embodiment of said automated onsite information search and multimedia system. A shopper is in a shopping mall area and has a cellphone installed with software of automated onsite information search and multimedia system displayed as "Shopping Deals". The shopper selects "Shopping Deals" button (FIG. 2A) on his cellphone and then selects "All Stores" button (FIG. 2B) in an attempt to get sales' information and discount coupons in the entire shopping mall area. Said software on said cellphone then sends a request on searching sales deals for the entire shopping mall area within said shopping mall.

Said cellphone receives all sales information from all the stores in said shopping mall from said software system's hosting web server and displays all the stores heighted that have sales offers (FIG. 2C) on a floor map on the screen of said cellphone.

Figure 2A:
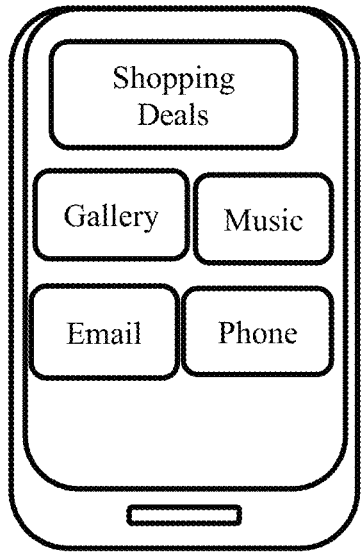
FIG. 2A illustrates a display rendering a home screen of a cellphone with "Shopping Deals" button.
Figure 2B:
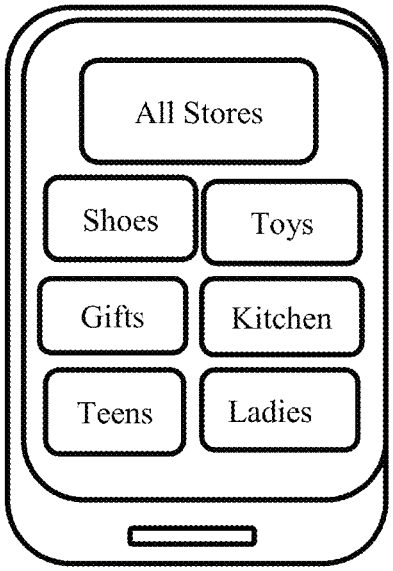
FIG. 2B illustrates a display rendering first screen of said onsite sales and commercial search method and system with its market name.
Figure 2C:
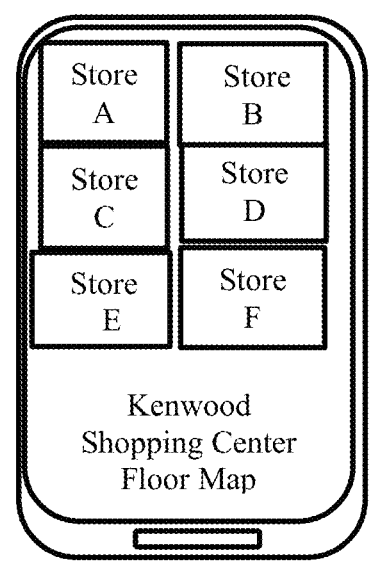
FIG. 2C illustrates a display rendering a flow map of mall displayed after a user selects "All Stores" button.
Figure 2D:
FIG. 2D illustrates a display rendering deals from a store after said user selects a store from said map.

Said shopper requests sales information from a store by touching said store's location and name on said floor map and the request is sent back to said software system's hosting web server. Said software system's hosting web server sends back entire available sales discounts offers posted by said store back to said cellphone and displays said commercial images on its screen (FIG. 2D).

Referencing to drawings, in FIG. 1 and FIG. 2 of another preferred embodiment of said automated onsite information search and multimedia system displayed on a cellphone as "Shopping Deals". A shopper is in a shopping mall area and has a cellphone installed with the mobile application of the system connected to a remote hosting server of the system. Said shopper selects "Shopping Deals" button (FIG. 2A) on his cellphone and then selects "Shoes" button (FIG. 2B) selecting to get sales' information and discount coupons for a particular merchandise category. Said mobile software then sends a request on searching sales deals for the entire shopping area within the shopping mall to said remote hosting server of the system.

Figure 2E:
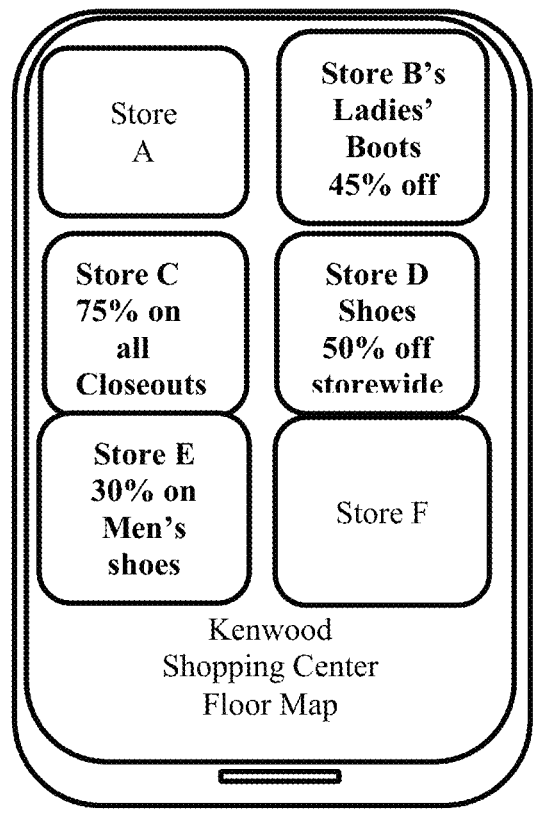
FIG. 2E illustrates a display rendering deals with stores selling shoes within the mall.

Information on said merchandise category from all stores with merchandises in the shopping mall are sent to said user of the system and displayed on said cellphone with commercial images (FIG. 2E).

Figure 5:
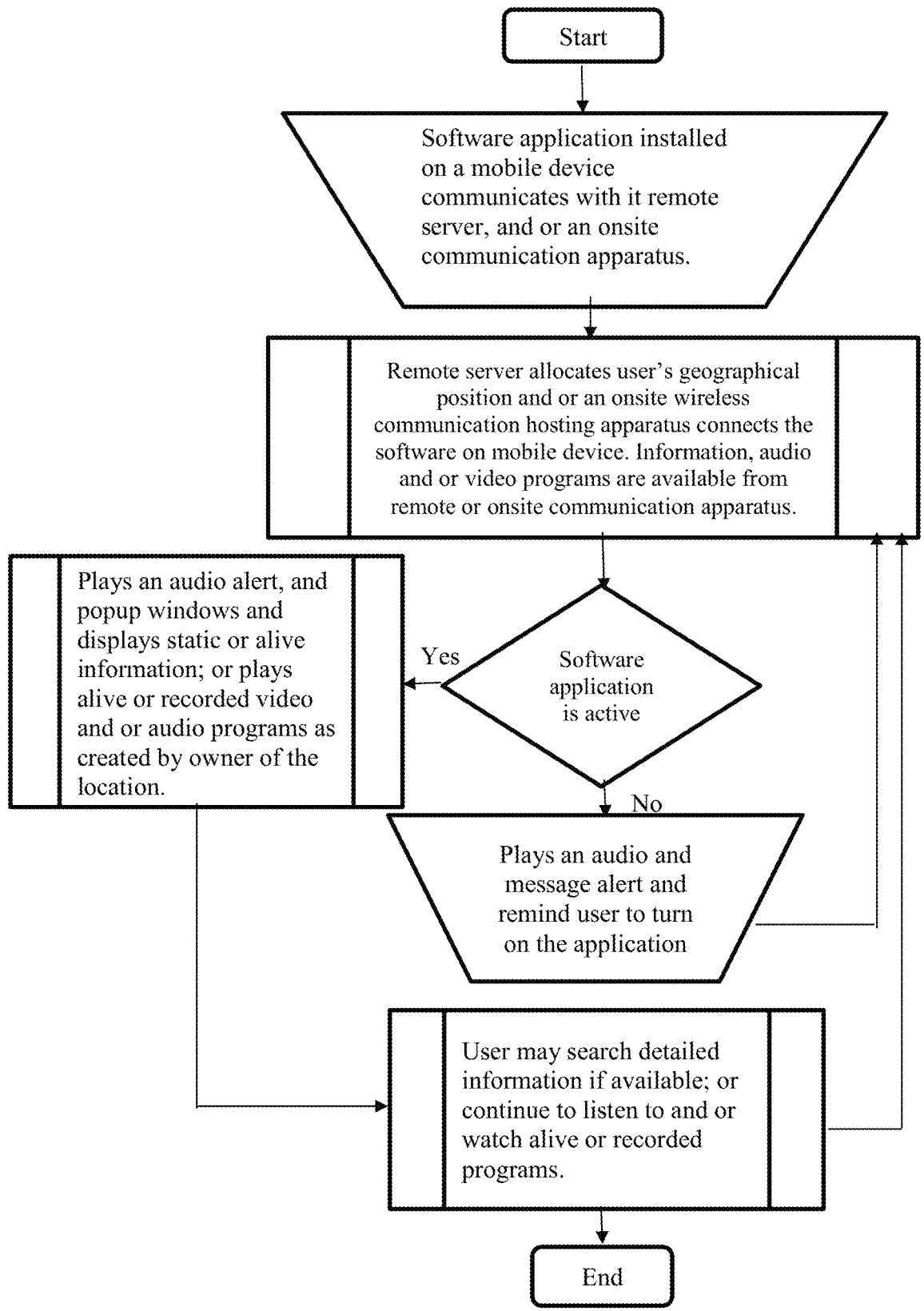
FIG. 5 illustrates a flow chart that demonstrates logical flows of an automated onsite information search and multimedia method and system.

Referencing to drawings, in FIG. 1, FIG. 3 and FIG. 5 of still another preferred embodiment of said automated onsite information search and multimedia system displayed as "Shopping Deals" on a cellphone screen. A shopper is in a shopping street area with a cellphone connected to internet and having a mobile software installed communicating remote hosting server of the system. Said shopper selects "Shopping Deals" button (FIG. 3A) on his cellphone and then selects "All Stores" button (FIG. 3B) trying to get sales' information and discount coupons from stores within a range of said shopping area. Said mobile app then sends a request on searching sales deals for all stores within a range of said shoppers' physical position to the remote hosting server of the system.

Said mobile device receives all sales information from all the stores in a range of said shopper's physical position and displays an area map with all the stores heighted that have sales offers (FIG. 3C) on its screen.

Figure 3A:
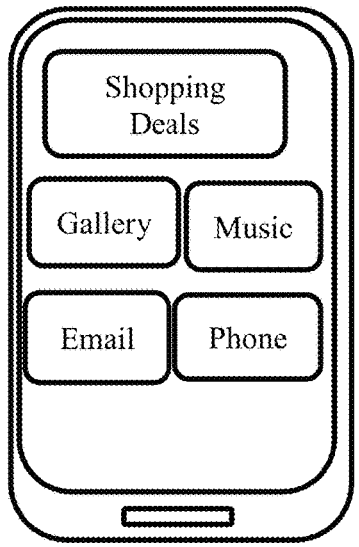
FIG. 3A illustrates a display rendering a home screen of a cellphone with "Shopping Deals" button.
Figure 3B:
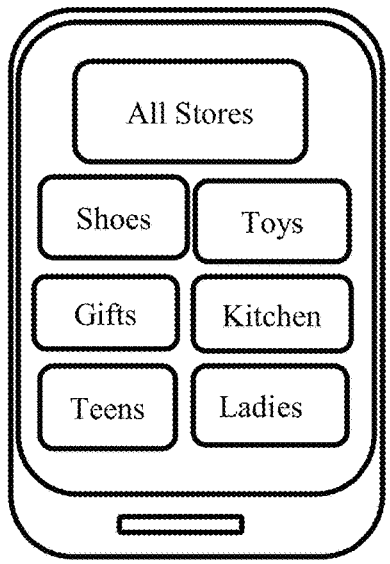
FIG. 3B shows first screen of said onsite sales and commercial search method and system with its market name.
Figure 3C:
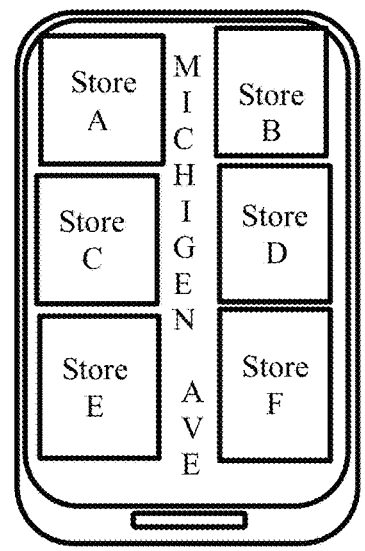
FIG. 3C illustrates a display rendering a street map with store and business layouts after user selected "All Stores" button.
Figure 3D:
FIG. 3D illustrates a display rendering deals from a store after said user selects a store from said street map.
Figure 3E:
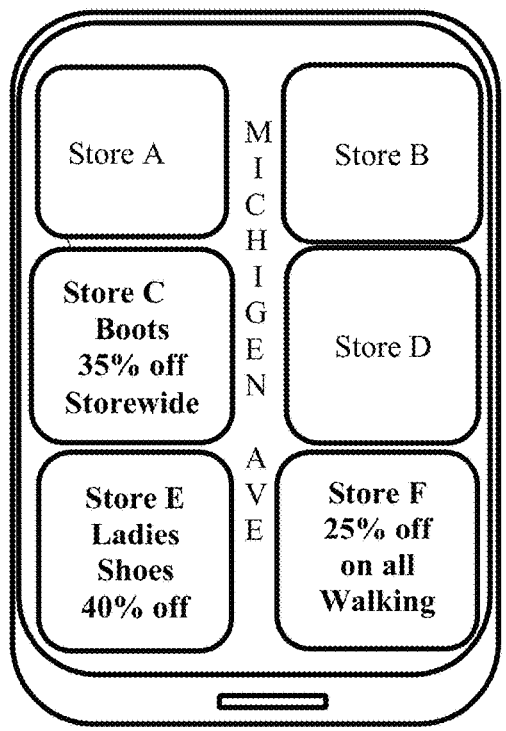
FIG. 3E illustrates a display rendering deals with stores selling shoes from stores displayed on said street map near said user.
Figure 4A:
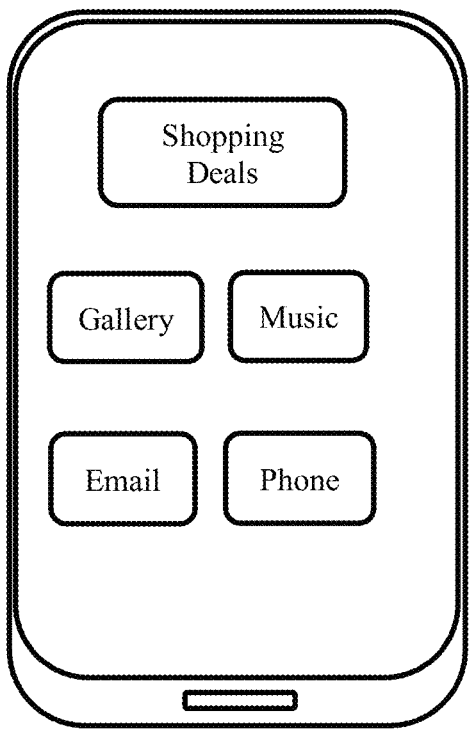
FIG. 4A illustrates a display rendering a home screen of a cellphone with "Shopping Deals" button.
Figure 4B:
FIG. 4B illustrates a display rendering deals in a department store as user is in said department store.
Figure 4C:
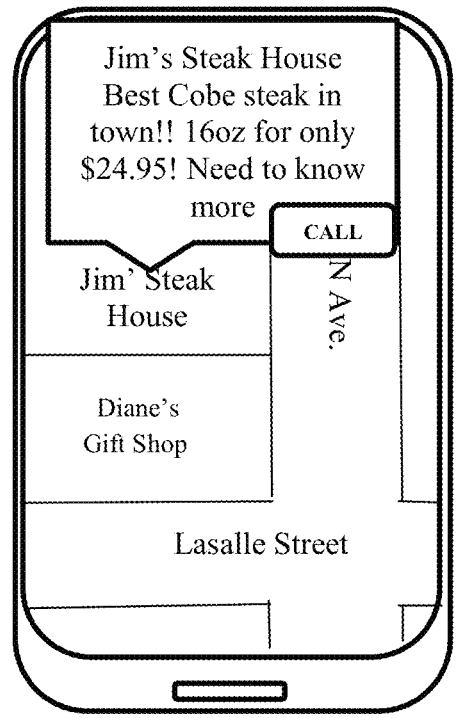
FIG. 4C illustrates an advertisement shown in a popup window as a user activated popup feature for showing onsite deals within a very close range.

Said shopper requests sales information from a store by touching said store's location on said onsite map and said request is forwarded to said remote hosting server and data are sent to said mobile app, and said mobile device receives entire available sales discounts offers posted by said store on the website(s), and displays said commercial images on its screen (FIG. 3D). A wide range of data and information from physical stores, business and entities are also available for said user (FIG. 3E, FIG. 4A-C).

Referencing to drawings in FIG. 5, FIG. 6A FIG. 10A-10C and FIG. 16, a preferred embodiment of said automated onsite information search and multimedia system. A user with a cellphone installed with software application of said automated onsite information search and multimedia system is in a supermarket, and said user's location is pinpointed by geo-positioning device and forwarded to said remote server of the system.

Said remote server checks its database for said location and its identity, and identifies that said location is one of locations registered with a national chain that runs a database and server. Said system is authorized by said national chain to allow direct and secured connection between its database server and server of said national chain. Said remote server activates connection and sends the location code to said database server of said national chain and said database server of national chain searches its database and retrieves data related to said supermarket. Starting from this point and via said remote server, database and server of said national chain and said software app installed on the cellphone directly communicate and transfer data, commands and requests. All information and programs received by said software application installed on said cellphone are directly sent out from said database server of said national chain via said remote sever of said automated onsite information search and multimedia system.

As said user enters the supermarket, a pre-recorded audio announces a welcome message and new products and good deals of the market for the day with a floor map with locations of merchandises; said software interface also provides a text entering box allowing shoppers to search for specific product. Said user did not use text enter box, rather speaks to said microphone on said cellphone and looking for "ACB brand coffee", the database server of said national chain locates said product from its database and sends back information and flashing with "Star" sign on a place on a shelf in aisle 1. Said user directly goes to said place and picks up said product without wasting anytime. As soon as said user leaves said location of said supermarket, said remote server cut off connection with said database server of said national chain.

The same onsite data and in-store data is also accessible for off-site users of a website of said system as said host server of said system retrieves data via a secured database access with a third party database server when users of said system select a location on digital map of said website.

Figures 10A, 10B:
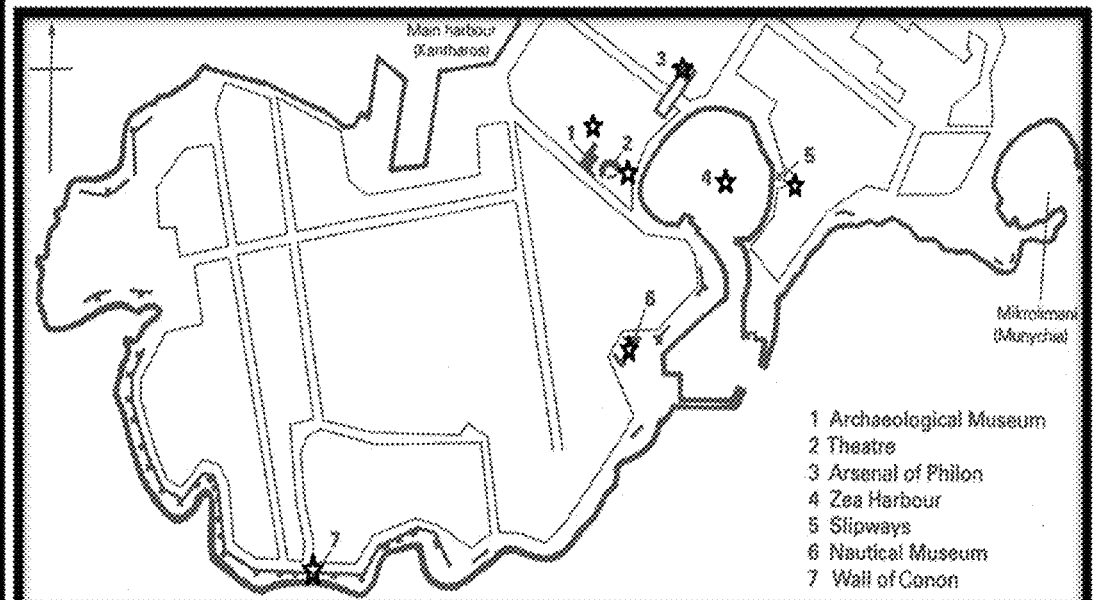
FIG. 10A illustrates a display rendering a selected location displaying last page of information after a sequence of programs and information are shown.
FIG. 10B illustrates a display rendering another location with live scenes in different sub-locations within a travel resort location.
Figure 10C:
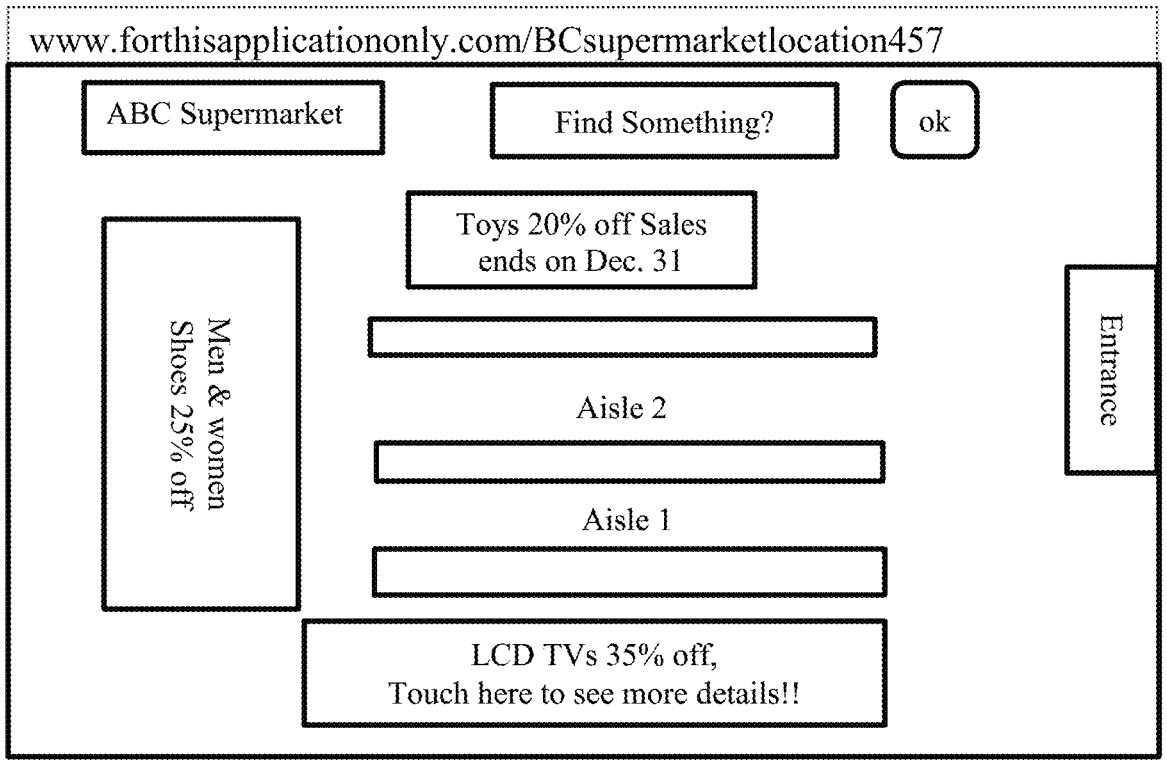
FIG. 10C illustrates a display rendering a supermarket published its updated information for the day with video recording clip and highlight sales and product location searching function.

FIGS. 13, 14A-B, and 15 show an embodiment similar to those describe with references to FIGS. 10A-C where a hosting web server is utilized in place of a website. Said software application communicates with its hosting web server, and said hosting server verifies location of mobile device installed with GPS and mobile application of said system and sends and displays information on a map or a floor layout on screen of said mobile device. When information is available, said system gives user audio and or visual signals and displays detailed information directly showing on a popup window with either static data, voice announcement or video clip. Shopper may also select to make a phone call even before get into the premises of a business.

Referencing to drawings in FIG. 5, FIG. 6B-C, FIG. 8, FIG. 9A-B, FIG. 11A-C, 12A, FIG. 14C-D and FIG. 16 of another preferred embodiment of the automated onsite information search and multimedia system. A user with a cellphone installed with mobile application of an automated onsite information search and multimedia system is outside of restaurant and read a menu board near its entrance. Said user's location is pinpointed by geo-positioning device installed on the user's mobile device and said software calculates that a timespan of said user staying within a close range of said location is longer than 20 seconds and likely said user is interested in staying at said location and not passing by, said software sends geo-position of said restaurant to said remote server. Said remote server receives said request and forwards information to said software application.

A recorded video clip, which was recorded by said restaurant owner with his cellphone and uploaded to said remote server, pops up on cellphone screen and welcome said user and shows a brief introduction of said restaurant and also best sales dishes and best deals of the day. A web user at home gets on a website, run by a web application configured with remote server of said system, and locates the restaurant on an interface of said website showing digital map by searching name of said business or related information. When said web user clicks on location of said restaurant on said digital map, the same video clip and the same information available for onsite visitors are also shown on said website. Users of said system may also he able to communicate with one another via social media functions provided with mobile app and website of said system.

Figure 6A:
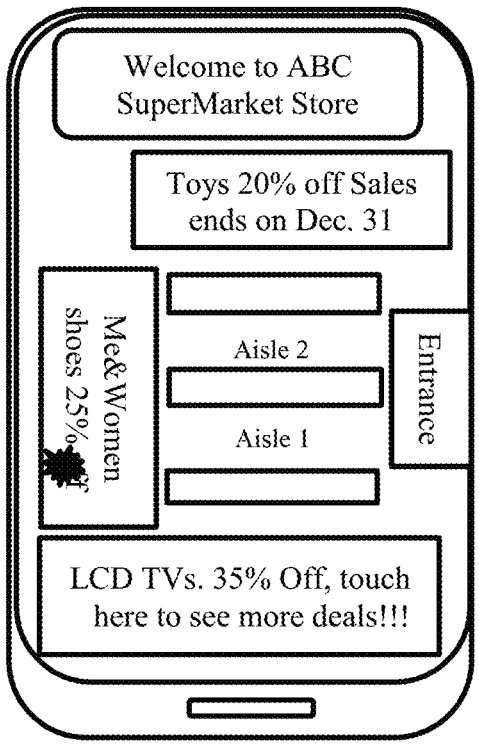
FIG. 6A illustrates a display rendering a specific position of a product located on store shelf in an aisle within a supermarket.
Figure 6B:
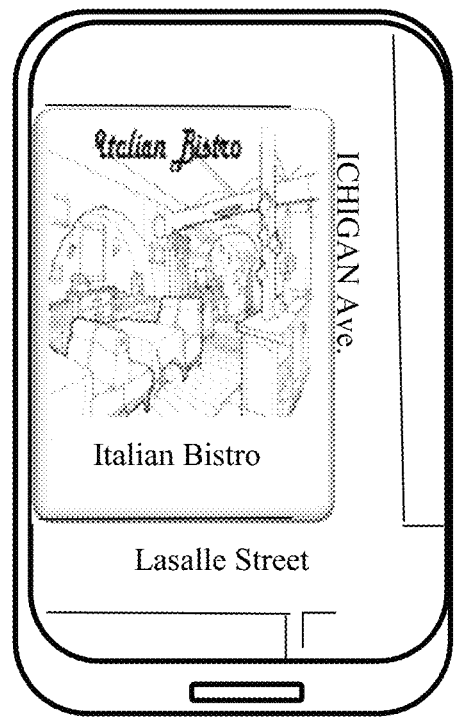
FIG. 6B illustrates a display rendering a visual program play on introduction of an onsite restaurant.
Figure 6C:
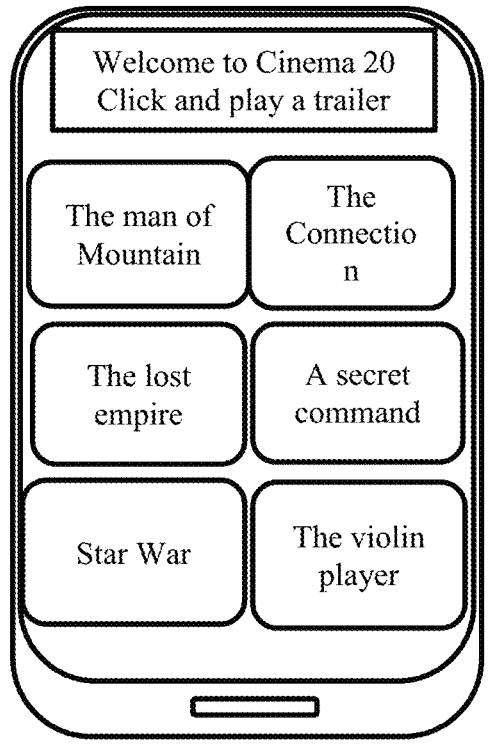
FIG. 6C illustrates a display rendering a screen of a cinema's information page with names of movies.

FIG. 5 and FIG. 6C depict more scenarios and samples involving connecting to remote database or an onsite wireless communication apparatus and retrieve information by said database server of said system and forwarding information received to users of said system, or directly receives information broadcasted from an onsite wireless communication apparatus. In such case users of the system may be not aware of data received is from remote server or onsite wireless communication apparatus.

Figure 19:
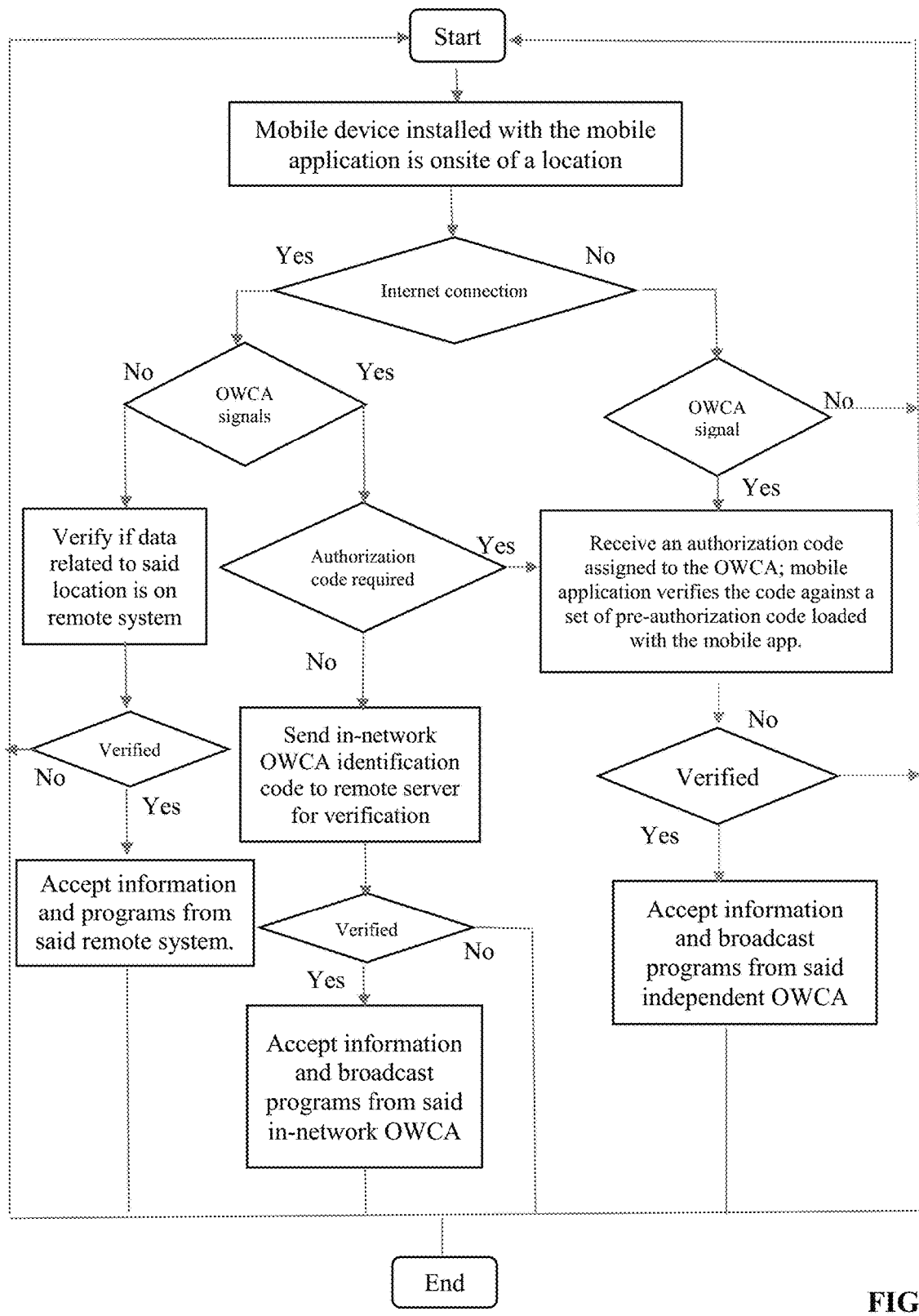
Figure 20:
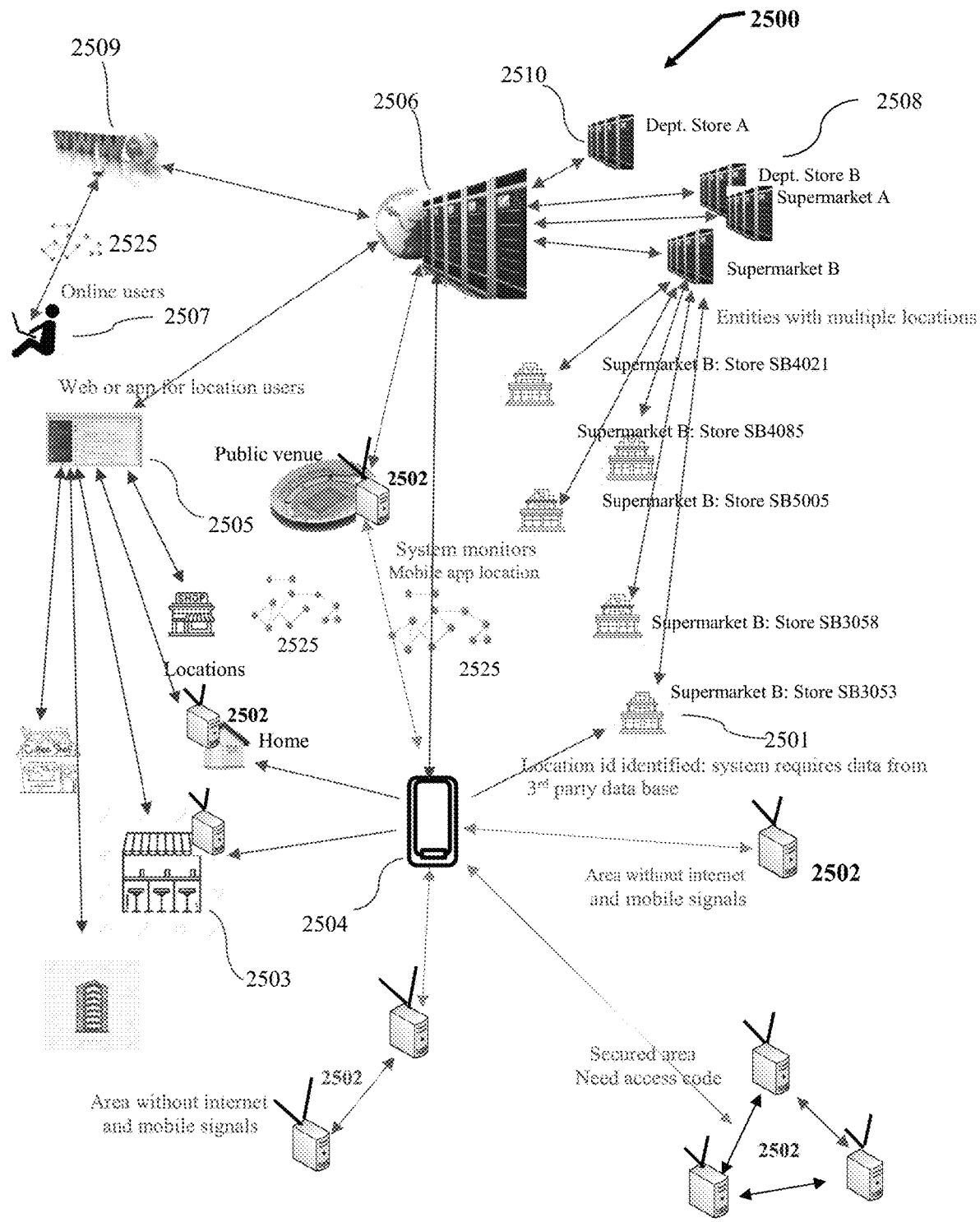
FIG. 20 is an exemplary diagram of systems architecture.

Referencing to drawings in FIG. 5, FIG. 19-20 of another preferred embodiment of said automated onsite information search and multimedia system. A user with a cellphone installed with software application of said automated onsite information search and multimedia system is at a concert hall and sitting in a back row.

An onsite wireless communication apparatus is installed in the concert hall and wired with a sets of video cameras sends live video broadcasting of performances to audiences using mobile software of said system, and said mobile software temporarily has audio and phone reception functions of the cellphone disabled in order to make sure that no noises disrupt the performance. Even though said user sits far back in the concert hall, he can clearly watch said performances on the stage.

Referencing to drawings in FIG. 5 and FIG. 19-20 of another preferred embodiment of the automated onsite information search and multimedia system. A user with a cellphone installed with software application of an automated onsite information search and multimedia system is in football stadium sitting in a back row, said user paid a fraction of price and bought a permit to watch onsite live video broadcasting.

An onsite wireless communication apparatus is wired with a sets of video cameras sends live visual broadcasting of the game. Said software application installed on the cellphone received an unique identification code at the time purchased the service. Once in the stadium, said software application opens a login window and asking said user to enter his permit number printed on his ticket. Though web and mobile signals are available the OWCA with the stadium sends signals requiring an authorization code from user's mobile device, once verified said software starts to receive live video broadcasting from the onsite wireless communication apparatus. Even though said user sits a back row of said stadium, he can clearly watch said match in the field. During breaks of the match, commercials and or information of third-parties are shown on said software application.

Said onsite wireless communication apparatus is connected to said remote server and transferring onsite information and live visual program to said remote database server. Said remote database sever transfers said onsite information and live visual program to its website, and also to said software application installed on said mobile device. Mobile and web users of the system from off-site places may select said information and live program and pay a fee to watch live games.

Figure 7:
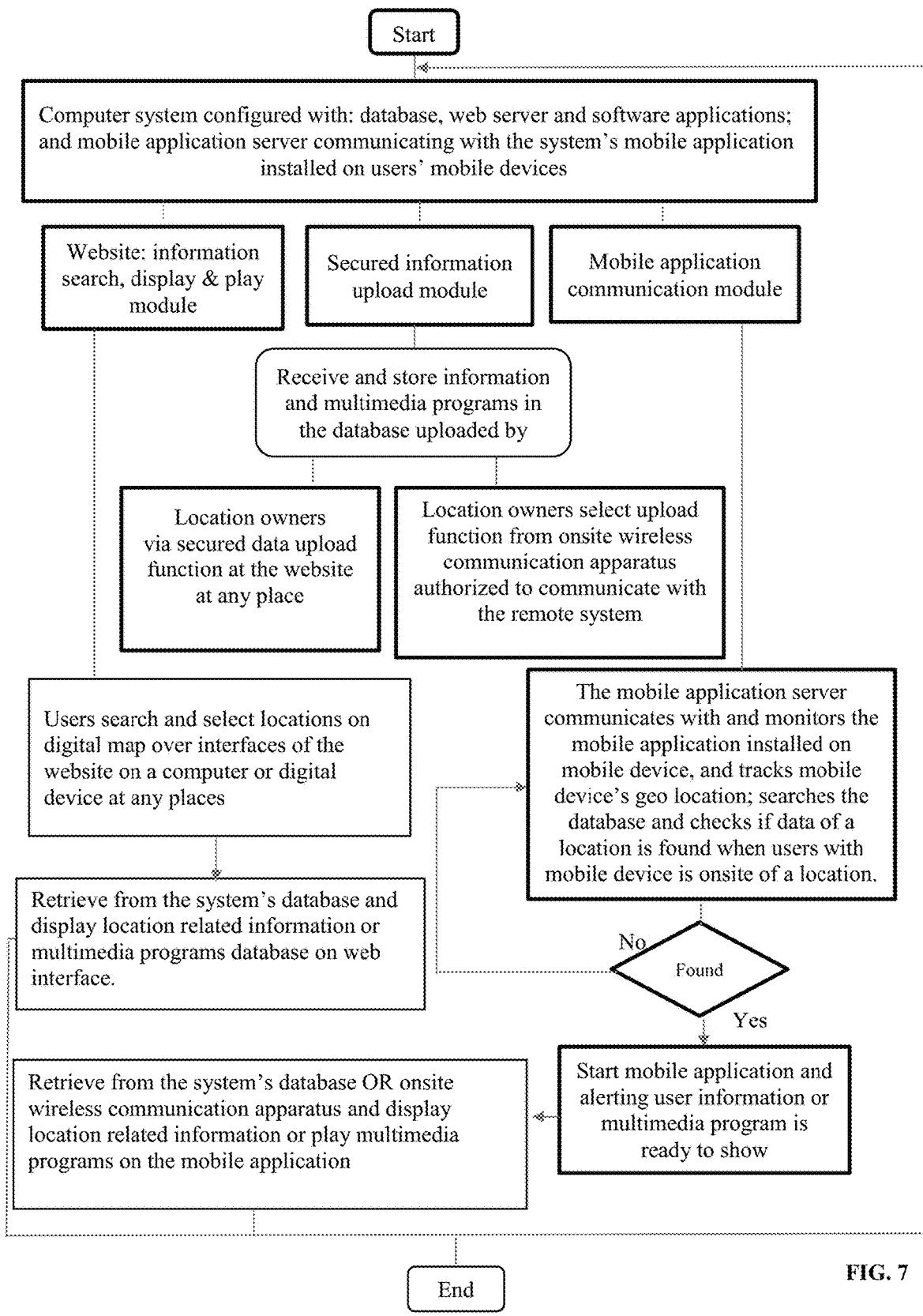
FIG. 7 illustrates a flowchart of said communication system.
Figure 10D:
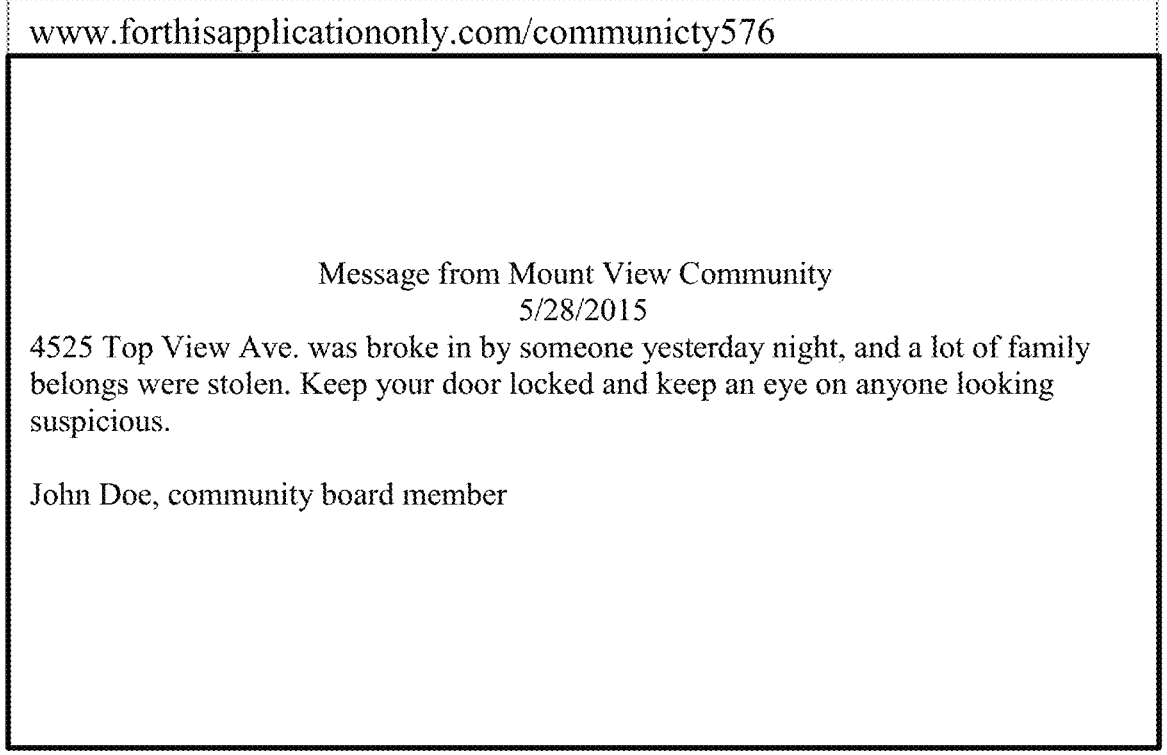
FIG. 10D illustrates a display rendering a message published by a community board member. To access information targeted to selected audiences or readers, secured access code is implemented in a public domain.
Figure 11A:
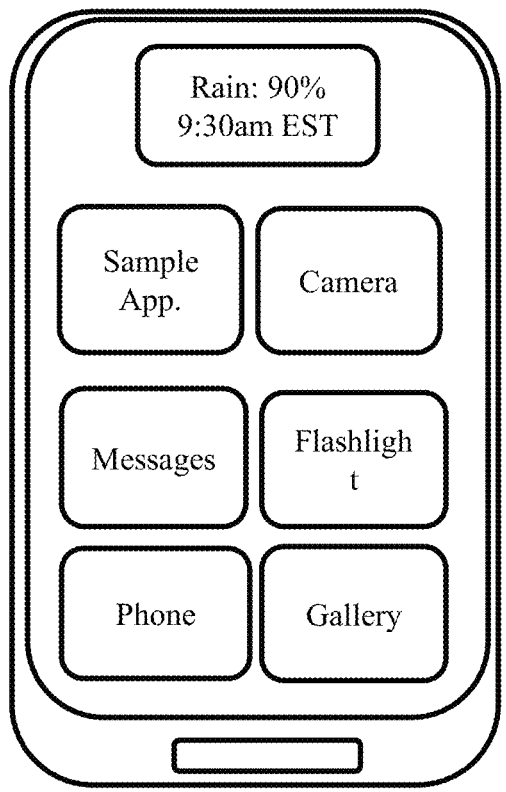
FIG. 11A illustrates a display rendering a first screen of a mobile application of said system installed on a mobile device.
Figure 11B:
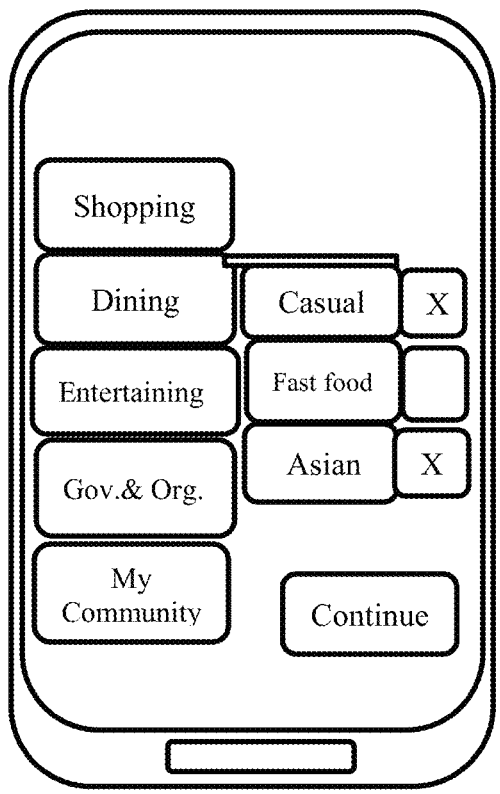
FIG. 11B illustrates a display rendering a selection screen of said mobile application.
Figure 11C:
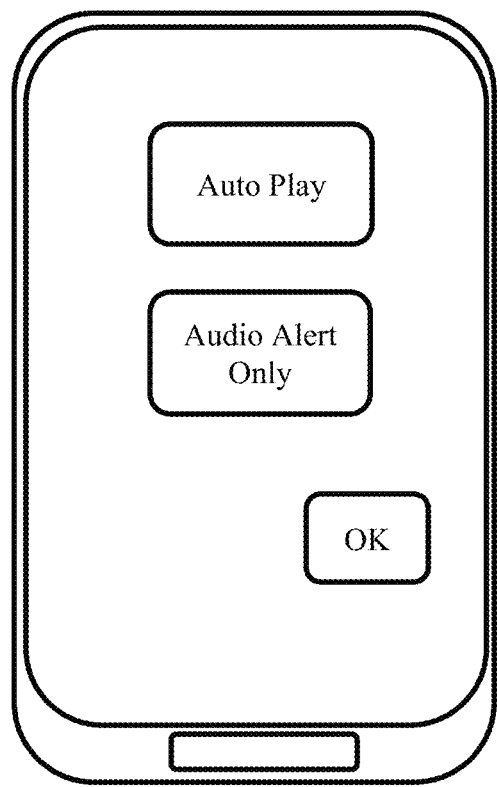
FIG. 11C illustrates a display rendering an options of auto play or alert only.
Figure 12A:
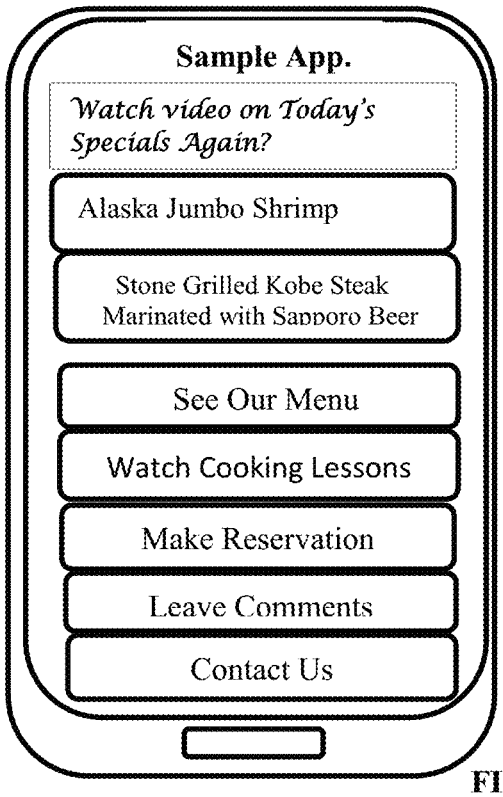
FIG. 12A illustrates a display rendering information or data shown from a location when a user with mobile device installed with mobile application of said system walk in a range of a location selected earlier.
Figure 12B:
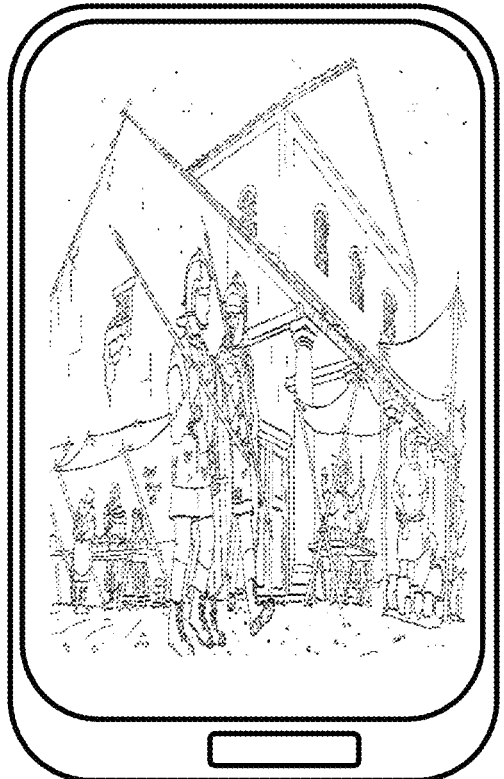
FIG. 12B illustrates a display rendering a simple map marked with interesting places within an ancient Greek town
Figure 12C:
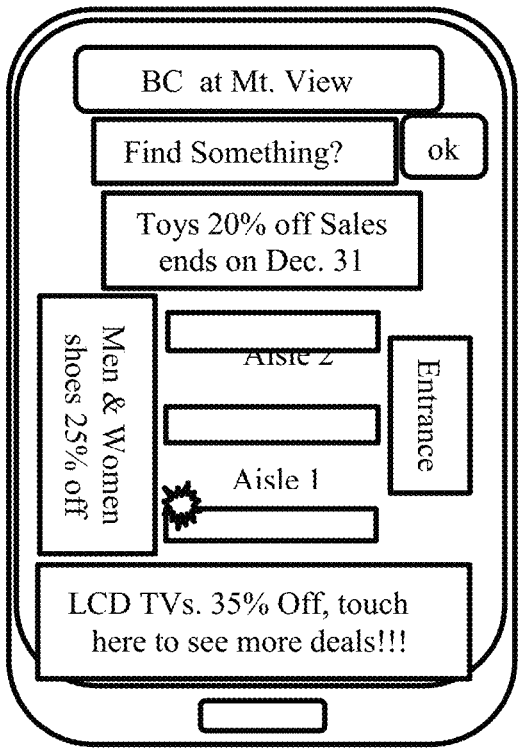
FIG. 12C illustrates a display rendering a supermarket homepage with updated information for the day with video recording clip and highlight sales and product location searching function on a mobile device.
Figure 12D:
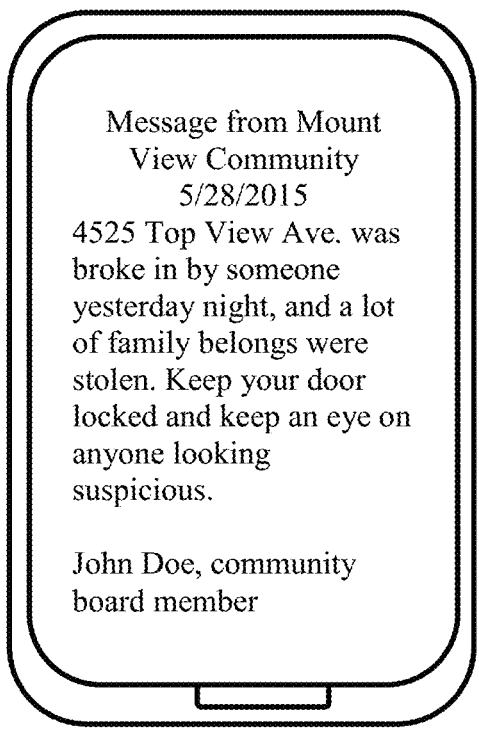
FIG. 12D illustrates a display rendering a message published by a community board member. Community members receive messages once they are. within a range of said community.
Figure 13:
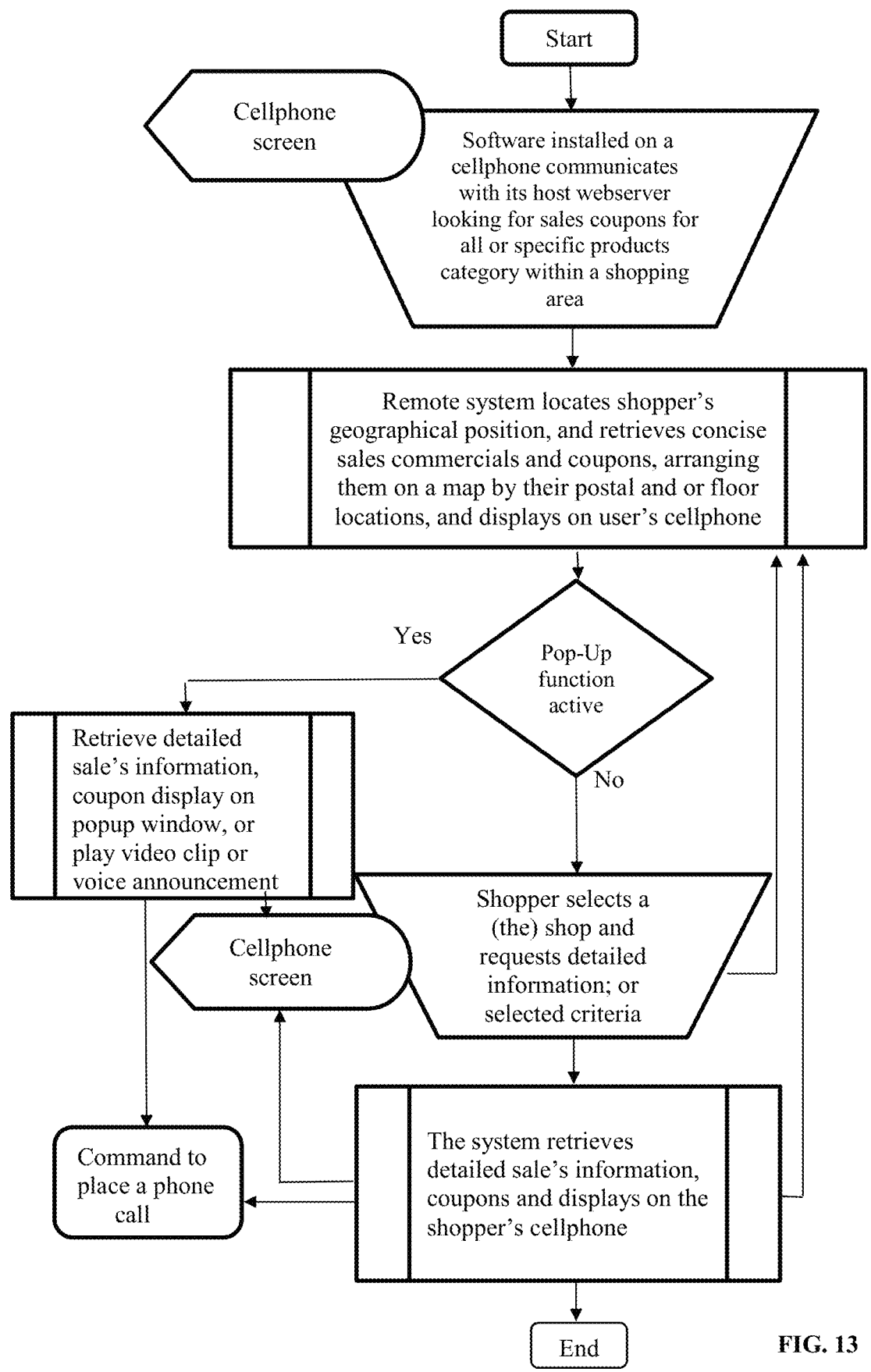
FIG. 13 illustrates a logic flow diagrams of mobile application.
Figure 14A:
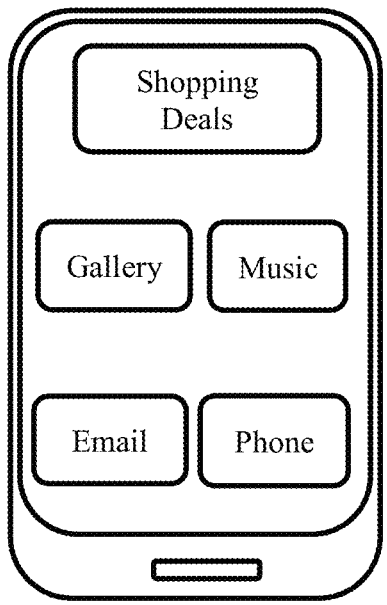
FIG. 14A illustrates a display rendering a screen of cellphone displayed with said mobile application of said software system.
Figure 14B:
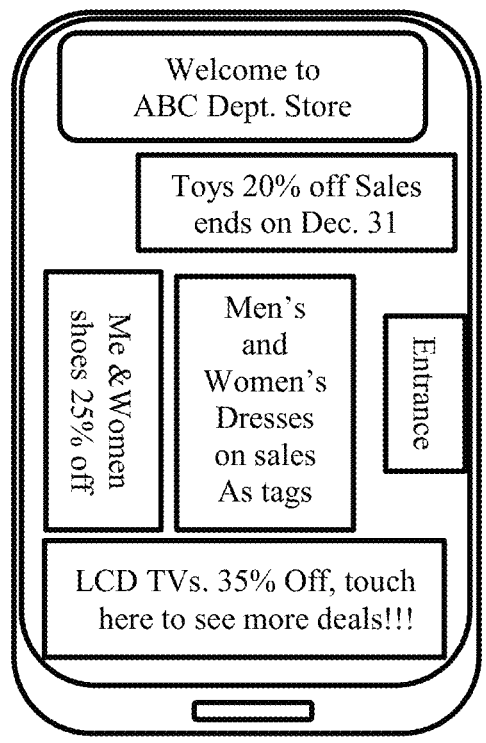
FIG. 14B shows a floor layout of department store with sections of merchandises locations and sales information.
Figure 14C:
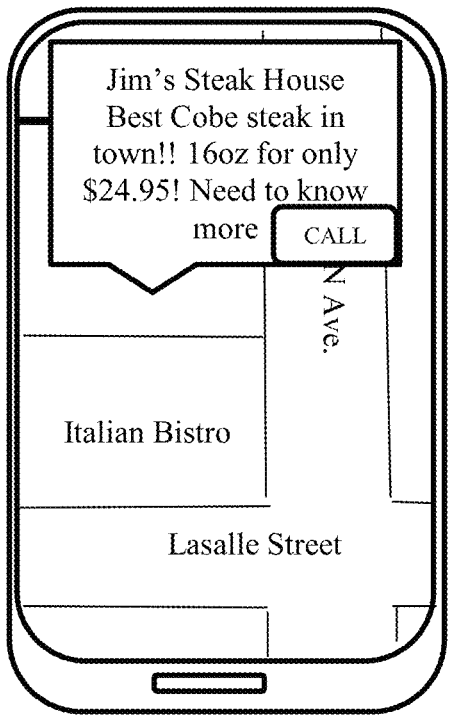
FIG. 14C illustrates a display rendering information of a restaurant received by said mobile application of said software system when user of said mobile device is outside said restaurant.
Figure 14D:
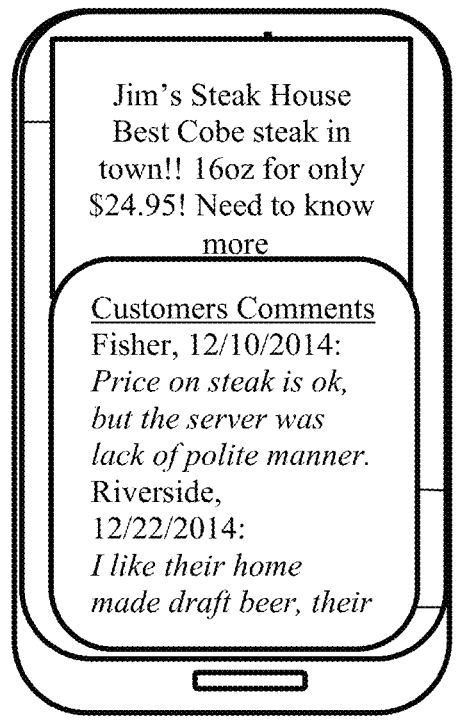
FIG. 14D illustrates a display rendering a messages posted by customers about a restaurant.
Figure 15:
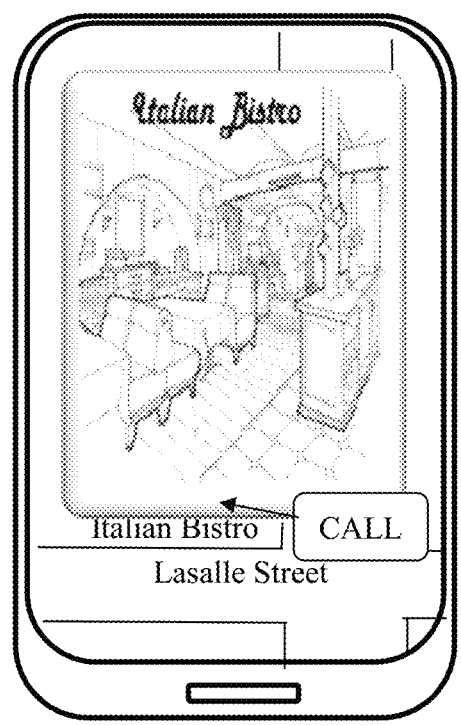
FIG. 15 illustrates a display rendering a menu option allowing mobile user to communicate with a business outside of said business.
Figure 16:
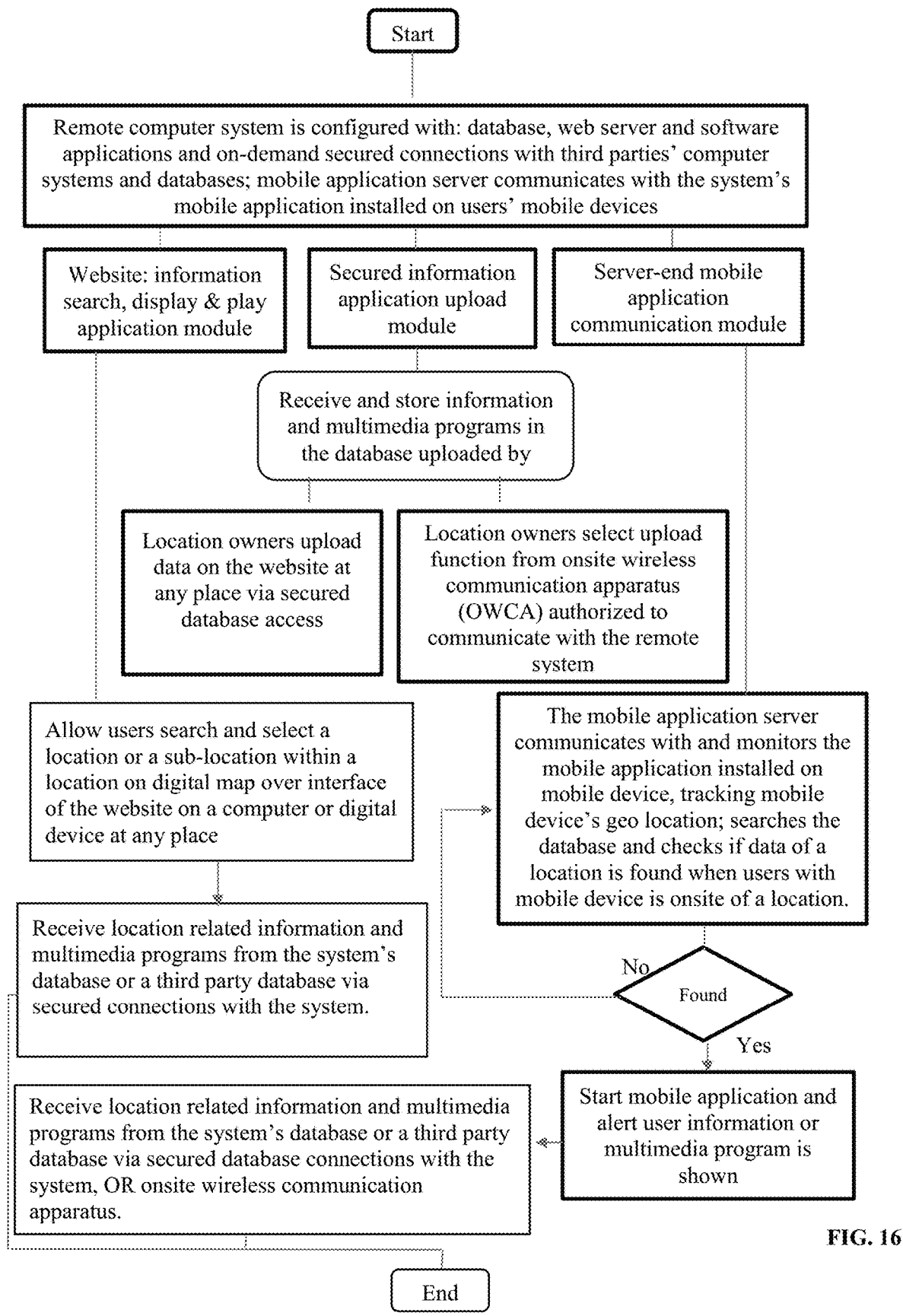
FIGS. 16-19 illustrate flow diagrams of an exemplary embodiment utilizing an OWCA to communicate with mobile devices and remote system servers.
Figure 17:
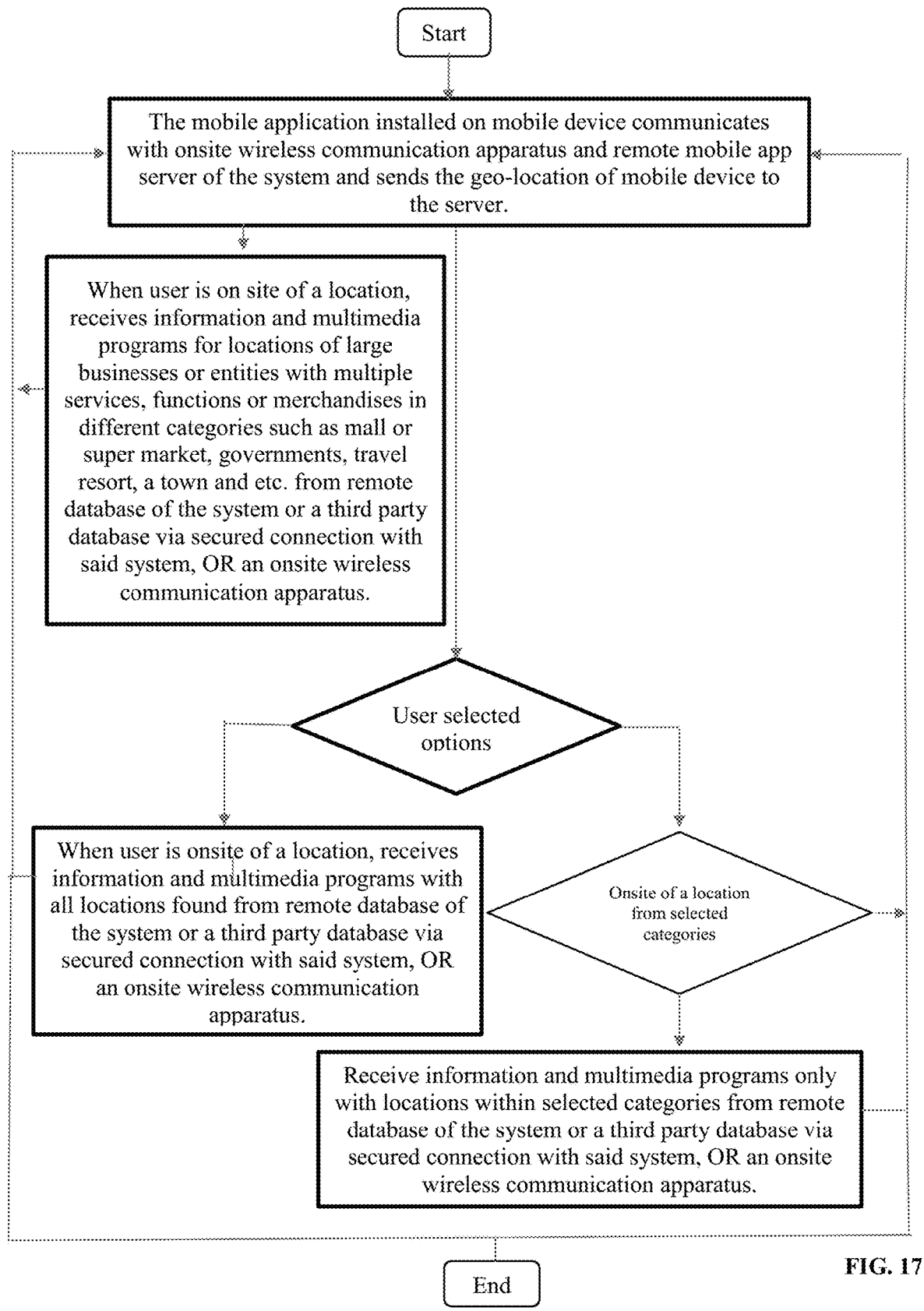
Figure 18:
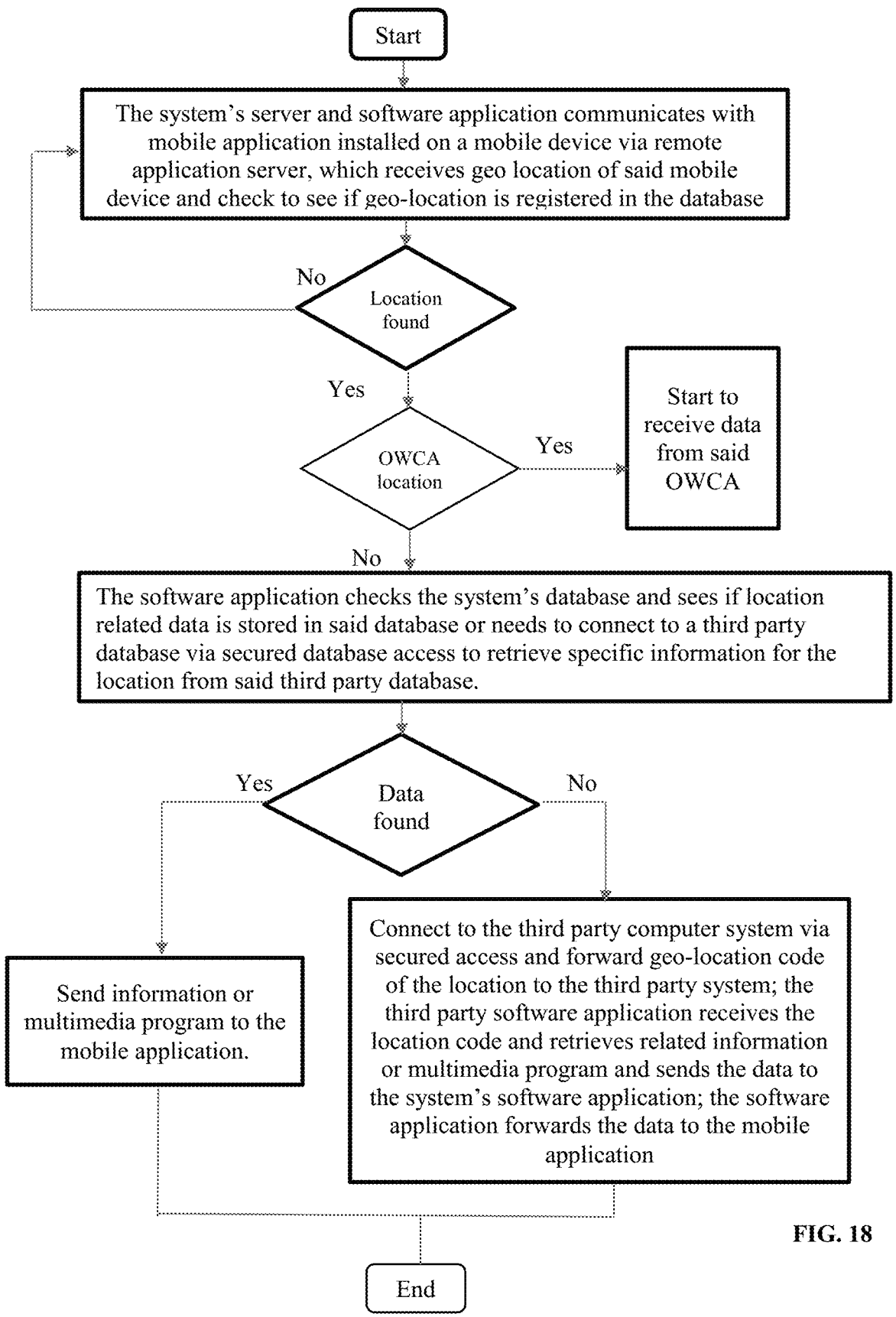

Referencing to drawings in FIG. 7, FIG. 10D and FIG. 12D, another preferred embodiment of the automated onsite information search and multimedia system. A resident of a community is out of town. He wants to know anything happening at home, and he gets on said website of said system, and finds location of his community. He clicks on the location and a small secured logon window appeared, he types in password shared by all residents of his community, a newly posted message shown up on said window, and he gets most updated information back home. He turns on social media functions and starts to live video chat with his neighbors using social media functions of said system. The same functions are also available on said mobile application of said system.

Figure 8:
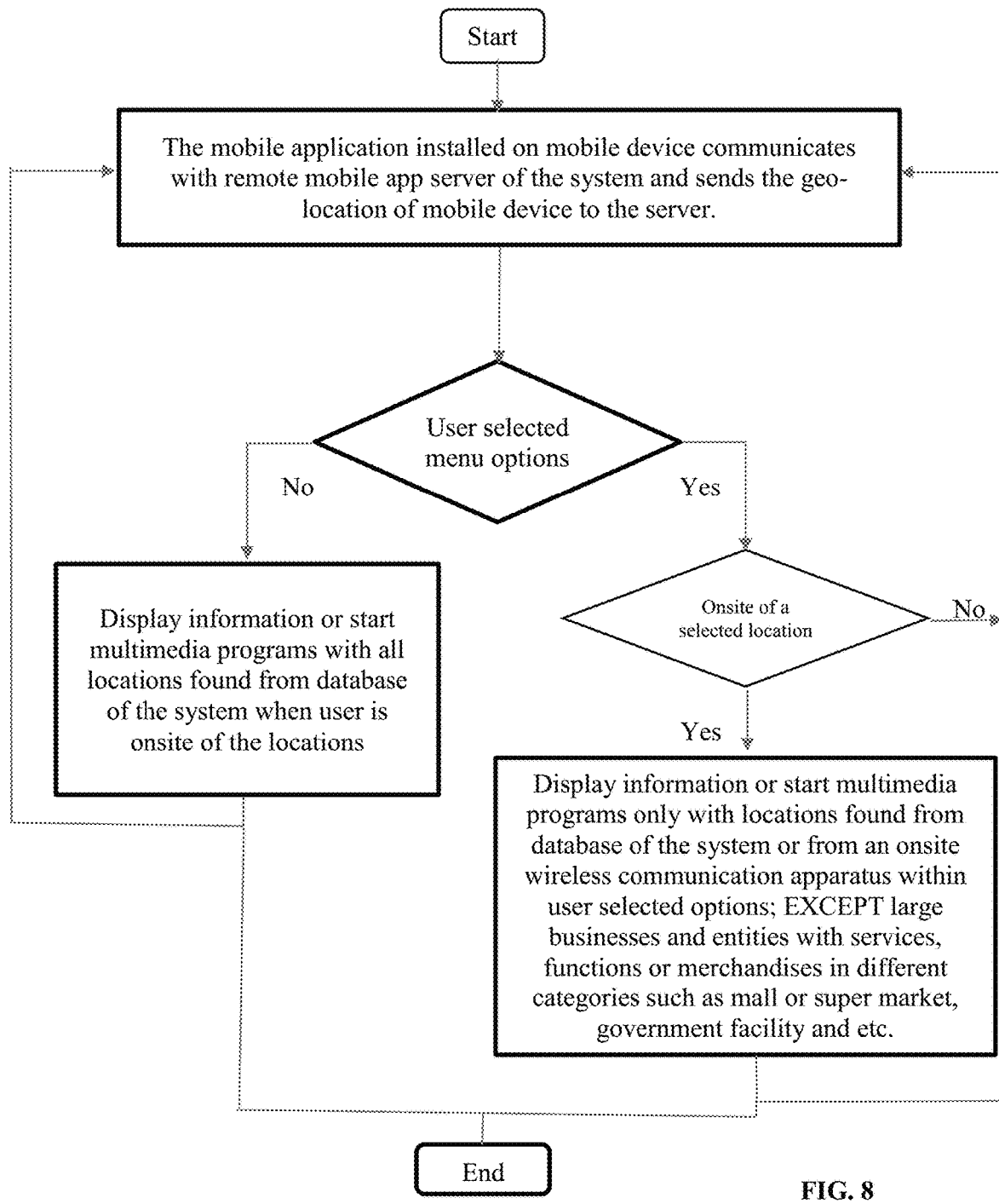
FIG. 8 illustrates a flowchart of functional logics of said mobile application.
Figures 9A, 9B:
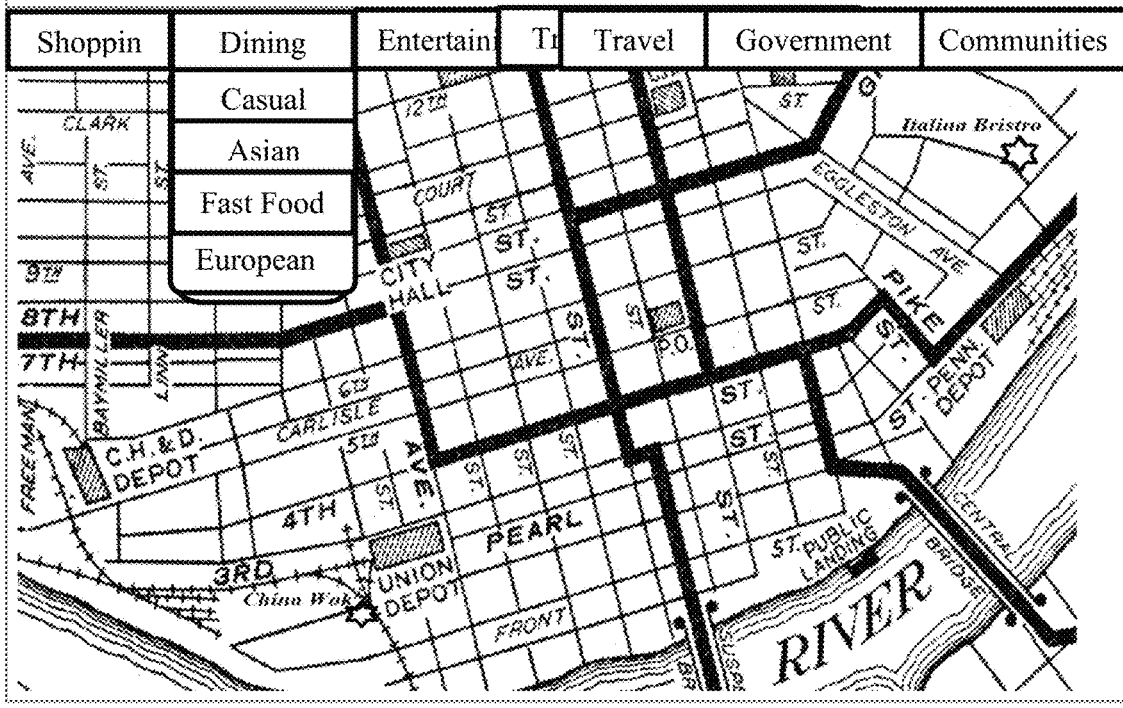
FIG. 9A illustrates a data searching screen with a text entering box for online users to enter their searching area and or category.
FIG. 9B illustrates a display rendering a digital map with drop down menu selections with different searching category, and selected location.

Referencing to drawings in FIGS. 7-8 and FIG. 12-B, another preferred embodiment of the automated onsite information search and multimedia system. A traveler with a mobile device installed with mobile application of the system visits an ancient Greek town.

Remote server of the system monitors geo-location of the mobile device installed with mobile application of said system with geo-positioning tracking device. As the traveler enters the Greek town, a recorded video clip pops up on his mobile device broadcasted by an onsite wireless communication apparatus located within said town, greeted him with brief introduction of the town. Then a very simple map marked with interests points are shown on the mobile device. Said traveler touches those interesting points on said map, live videos are broadcasted to show scenes of these places. Said traveler selects places he is interested and arranges a short cuts to get to those places even before starts his trip.

Said traveler walks through different places, a recorded video demonstrating live scenes and daily life of said town people is shown on the software application installed on said mobile device accompanied with narrations. As selections setup by owner of said Greek town travel resort on said website, said owner intends to run some more valuable videos for onsite visitors with paid admissions only.

Turning now to FIGS. 16-22, described are embodiments of a computerized offsite and onsite synchronized information portal system 2500 of FIG. 19 that may primarily comprise of database, web server 2506 and website applications; software applications connected to third party servers and database 2508 via secured connections 2510, onsite wireless communication apparatus (OWCA 2502) 2502; mobile application server and mobile application installed on users' mobile devices 2504. The flow charts of FIGS. 16-19 generally describe algorithms used by the various system components 2502, 2504, 2506, 2508, and 2510 of FIG. 20. It is noted that various embodiments disclosed above may also include implementation of logics to connect or route users with different components of said system under different circumstances.

Location owners, as described herein, may upload data via secured data uploading function on said web server 2506 and website applications at any geographical location. In an embodiment, owners with an OWCA 2502 authorized to communicate with remote systems may select an upload data function to upload data to remote server 2506, and activate onsite broadcasting function.

Said system database server 2506 and website applications 2509 are configured to provide online users with search and selection functions on locations over digital map on interfaces of said website on a computer or mobile device 2504 at any places; said system retrieves data related to said selected location from database of said system, location, interior structure and sub-locations related information or multimedia programs are shown on said web interfaces 2509 of the computer or mobile device 2504.

Said mobile application server communicates with and monitors said mobile application installed on the mobile device 2504. In another aspect, said mobile application server tracks said mobile device 2504's geo location based on GPS signals, OWCA signals, wireless signals from data points, user entered information, or the like. It is noted that any method of location tracking may be utilized.

Said mobile application server may search said database and checks if a location is associated with an entry in the database based on the identified geolocation. In another aspect, said mobile device 2504 may communicate directly with an OWCA for location information and to establish a connection. Once a location is found within user selected options, the mobile device 2504 may show information or multimedia programs based on data received from an OWCA 2502, or information received through the web server 2506. In an aspect, the mobile application may allow a user to select an option to automatically generate an alert when such information is available and/or received. In another aspect, the mobile device 2504 may directly communicate with the OWCA 2502 when the mobile device is within a geographic area of the OWCA 2502. It may he required to establish secured connections without going through mobile networks and, in addition, may reduce data consumption of a user with mobile device 2504 since there is no need to communicate via a wireless service provider.

Said mobile application on said mobile device 2504 may be configured to allow users to select interested categories and sub-categories of locations before start his or her route. The categories may be stored in a memory of the mobile device 2504. In another aspect, the mobile device 2504 may automatically select categories based on user selected criteria, use history, past user likes, information received from third party services (e.g., social media, etc.), or the like. In an example, a user may not select any options from said mobile application menu, and the mobile device 2504 may display information or multimedia programs of all places found from said database of said remote system or said onsite wireless communication apparatus.

In another embodiment, information and multimedia programs of large businesses and entities with multiple services, functions or merchandises may be identified in different categories such as mall or super market, government bodies are shown at all time regardless of whether menu options selected by said mobile users. This may allow larger entities to show a number of different options to a user.

Location owners have options to get on said website 2505 at any places, or their onsite wireless communication apparatus 2502, to create secured accounts, register their geographical locations or postal addresses, nature and functions of the locations along with other information; select functions and features available within their accounts and publish their information, connect video or audio equipment to said OWCA 2502 for live broadcasting or upload recorded audio and video recordings; select sequences of presenting said information, data and or recorded or live programs. In an aspect, the location owners may have accounts registered with a service provider.

Once they are registered with geographical locations or postal addresses and select to publish their information or data, their geo-position will be: a. marked with an image showing the nature or functions of the place along with name of their business, facilities, entities, government bodies or organizations on a digital map of said website; b. associated with mobile device users having said mobile application and physically within a range of the geo-position. The location owner may select and/or edit the image, information, or other associated information. It is further noted that the location owner may view the mobile device's 2504 within range of their OWCA 2502. It is further noted that the location owner may black/white list certain mobile devices 2504. For instance, if a mobile device 2504 is associated with suspicious or undesirable activity, the location owner may select to disable the connection of the OWCA 2502 and the mobile device 2504.

Said system's remote server and database 2506 may be communicating via secured connections with remote server and database of third parties 2508. A user may access a location on a digital map 2509 from an online connection and/from a mobile device 2504. When the location is selected or a user with mobile device installed with mobile application of said system is onsite of a location, the database 2506 may query entries to search for and identify entries associated with the location. For instance, the database 2506 may identify a store with a registered account in the vicinity of the mobile device 2504. In another aspect, the database 2506 may query the third party database 2508 via a secured connection 2510. The database 2506 may receive information via the secure access 2510 from the third party 2508. This may allow the system 2500 to have a closed or otherwise secured connection. As such, OWCA's 2502 may maintain a secure connection for mobile device 2504. This may allow the location owners to send most updated and specific information of the said location to said mobile users and also to connect with users without the users worrying about unwanted attacks from hackers or the like.

In another aspect, the OWCA's and/or remote server 2506 may transmit information (e.g., multimedia programing, advertisements, etc.) via a web interface 2509 for online users 2507. For users accessing a OWCA 2502, the mobile device 2504 may generate a notification that the information is available. In some embodiments, the mobile device 2504 may automatically display the information with notifying the user. Users of the system may also communicate with one another or user groups via social media features and functions provided by the system 2525.

OWCA's 2502 may be configured to connect to said remote server 2506 of said system 2500 via internet connection, as described herein. in another aspect, OWCA's 2502 may operatively communicate with other OWCA's 2502. For instance, a large location (e.g., mall, office building, stadium, village, construction site, military base, etc.) may utilize multiple OWCA's 2502 to cover a large geographic area. In this instance, OWCA's 2502 may communicate with each other or with a central OWCA 2502 that may, in turn, communicate with the remote server 2506. It is noted however, that each OWCA 2502 may communicate with the remote server 2506 and/or may selectively disable or prevent communication with the remote server 2506.

A user of a mobile device 2504 installed with said mobile application may be within a location where there is no OWCA 2502 or an OWCA 2502 has malfunctioned. As such, the mobile device 2504 may communicate directly with the remote server 2506. Once a OWCA 2502 is identified or otherwise properly functioning, the mobile device 2504 may terminate connection with the remote server 2506 and may communicate directly with the OWCA 2502. It is noted, however, that the mobile device 2504 may continue to communicate with the remote server 2506 as well as the OWCA 2502. For instance, the OWCA 2502 may provide location specific information, high-bandwidth information, or the like, while the remote sever 2506 may provide general information (e.g., a map of a larger region), low bandwidth information, etc.

In at least one embodiment, the system 2500 may require the OWCA 2502 to register with the remote server 2506 to enable access or communication with the mobile device 2504. According to one embodiment, the mobile device 2504 may request an identification code from the OWCA 2502. The mobile device 2504 may forward the identification code to the remote server 2506 for verification. The remote server 2506 determines whether or not to verify the OWCA 2502 and may forward the information to the mobile device 2504.

In at least one embodiment, an OWCA 2502 may be associate with a rating or classification. For instance, an OWCA 2502 may be associate with adult content, a particular type of food, a secured environment or the like. When the remote database 2506 receives the verification code, it may cross-reference user settings and the OWCA 2502 classification. If, for example, the mobile device 2504 has enabled parental controls, the remote database 2506 may prevent the OWCA 2502 classified for adult content from communicating with the mobile device 2504. In another example. the OWCA 2502 may associate with food containing allergies (e.g., nuts). The remote database 2506 may cross reference user settings identifying the allergies and may notify the user via the mobile device 2504 when the user is identified as allergic to the particular allergen. These, of course, are merely examples of possible communications. As such, this disclosure is not limited to such.

It is noted that the remote database 2506 may be off or otherwise not available in a particular area or to a particular mobile device 2504. In such embodiments, OWCA 2502 may communicate with the mobile device 2504 directly for verification. A user may manual verify an OWCA 2502, such as through an on-screen prompt. In another aspect, the mobile application may check said OWCA 2502 authorization number against authorization codes previously received from the remote database of the system 2506 through a remote access point before the remote database 2506 was off or otherwise unavailable and stored with said mobile application which are assigned to those OWCA's 2502 in the areas or regions which have no internet or cellphone signals, once verified said mobile application may receive information and multimedia programs broadcasted from said OWCA's 2502. It is noted that the mobile application may store a list of pre-registered or previously visited OWCA's 2502. Moreover, a user may selectively remove an OWCA 2502 from a pre-registered list.

Figure 21:
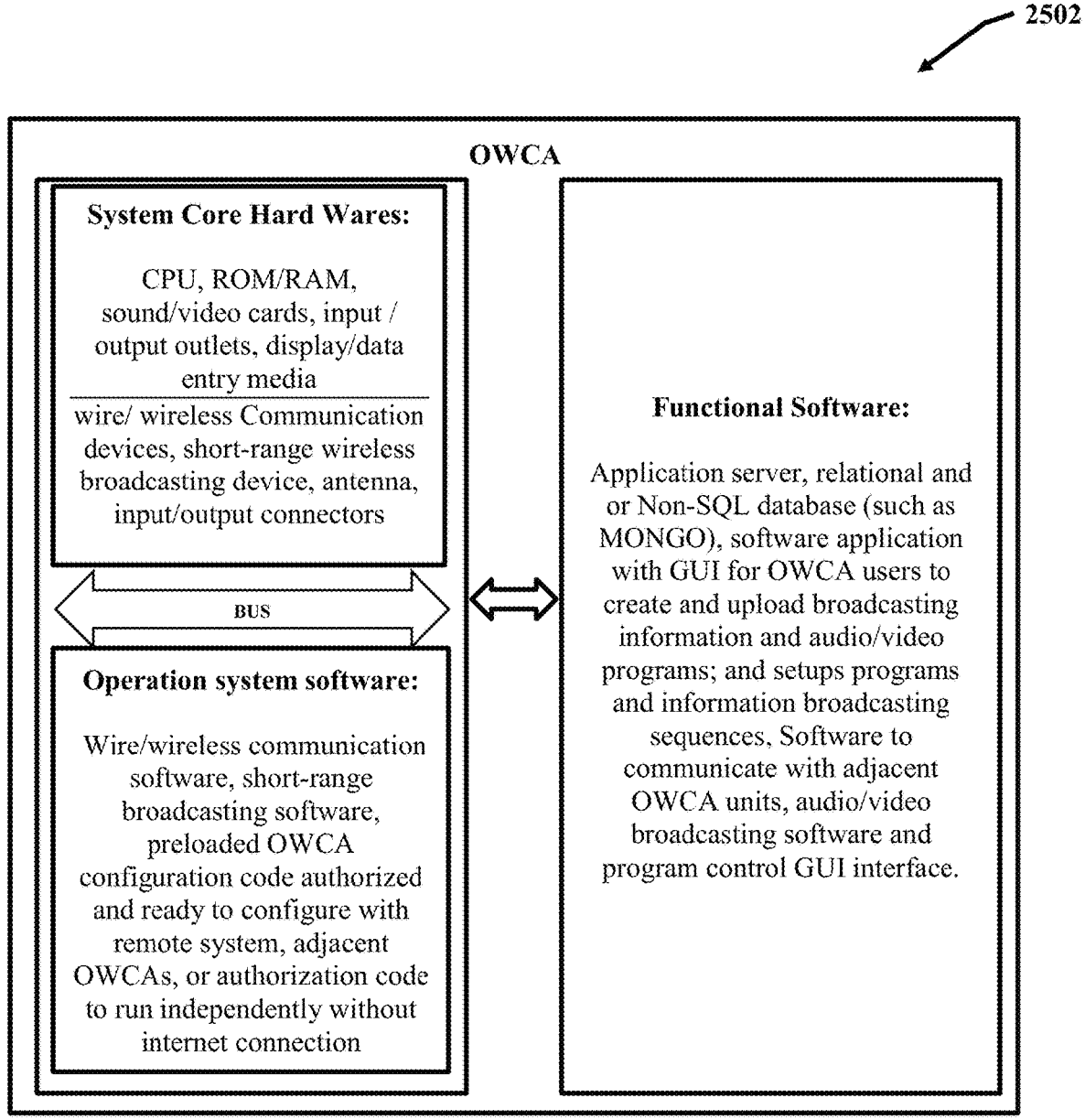
FIG. 21 is an exemplary functional block diagram showing a structure for an OWCA.
Figure 22:
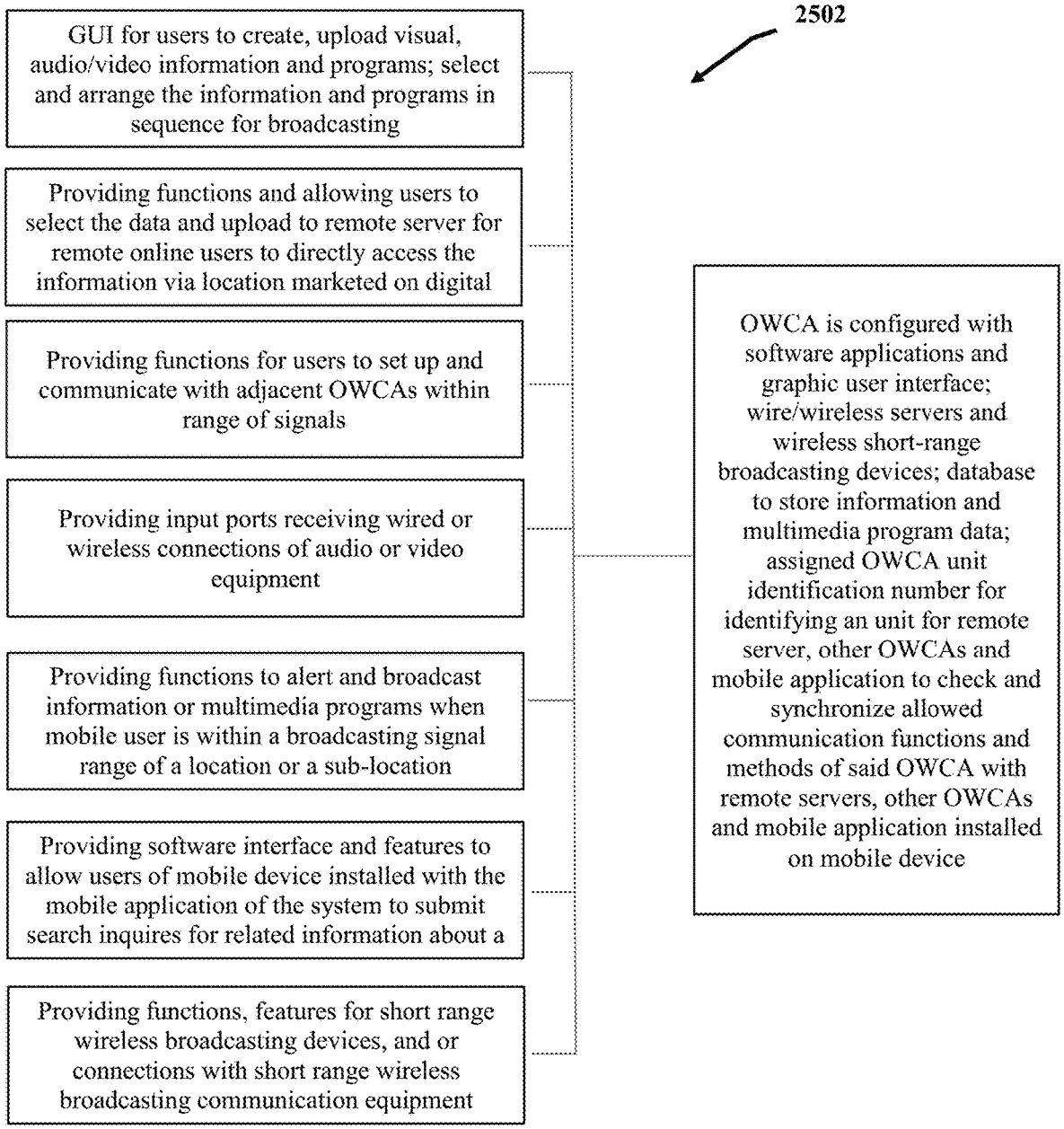
FIG. 22 is an exemplary functional block diagram showing a system architecture of an OWCA.

FIGS. 21-22 illustrate exemplary block diagrams of structures and functionalities associated with an OWCA 2502. The OWCA 2502 may comprise various components, hardware devices, software, software in execution, and the like. In embodiments, OWCA 2502 may include a system bus that couples various system components. Such components may include a processing unit(s), system memory device(s), long term storage devices, i/o devices, transceivers and the like. The various components may be employed to perform aspects or embodiments disclosed herein.

The processing unit(s) may comprise various hardware processing devices, such as single-core or multi-core processing devices. Moreover, the processing unit may refer to a "processor," "controller," "computing processing unit (CPU)," or the likes. Such terms generally relate to a hardware device. Additionally, the processing unit(s) may include an integrated circuit, an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or the likes.

In embodiments, OWCA 2502 may be utilized as a client and/or a server device. As such, OWCA 2502 may include communication connection(s) for connecting to a communication framework. For instance, communication connection(s) may include cellular antennas, wireless antennas, wired connections, and the likes. Such communication connection(s) may connect to networks via communication framework. The networks may include wide area networks, local area networks, facility or enterprise wide networks (e.g., intranet), global networks (e.g., Internet), satellite networks, and the likes. Some examples of wireless networks include Wi-Fi, Wi-Fi direct, BLUETOOTH™, Zigbee, and other 802.XX wireless technologies. It is noted that communication framework may include multiple networks connected together. For instance, a Wi-Fi network may be connected to a wired Ethernet network.

In an aspect, the communication connection between an OWCA 2502 and a mobile device 2504 may utilize one or more different communication protocols. In at least one embodiment, the OWCA 2502 utilize wireless communication protocols that are generally confined to a particular coverage area such that the OWCA 2502 does not interfere with other OWCA's 2502 and/or is more closely associated with a particular location.

An automated onsite information search and multimedia method and system comprising: software application installed on a mobile device such as a cellphone coupled to internet connection and a web-map such as google map or GPS (Global Position System); a hosting webserver is capable of communicating with said software application and automatically updating location of said software application; and or an onsite wireless communication hosting apparatus with multimedia data hosting, information publishing and broadcasting capacities; said software application is capable of receiving data and signals from said hosting server and or said onsite wireless communication hosting apparatus. An automated onsite information search and multimedia method and system comprising: software application installed on a mobile device such as cellphone; an onsite wireless communication hosting apparatus with multimedia data hosting, information publishing and broadcasting capacities; said software application is capable of receiving data and signals from said onsite wireless communication hosting apparatus. The software application on said mobile device coupled with said web-map or GPS is capable of updating and sending accurate physical location of said mobile device to said hosting webserver. The software application on said mobile device coupled to graphic user interface is capable of submitting a request by user for conditioned information search within a range, postal address and or at location of said mobile device; and displays requested information sent back by said hosting webserver or said onsite wireless communication hosting apparatus according to their actual physical locations and or actual floor layouts within a radius range of said mobile device. Said software application on said mobile device may be deployed on a web browser installed to said mobile device. Said software application on said mobile device is capable of displaying floor layouts within structures of a building, or layout of structures and or functional areas of a facility or an entity. Said hosting webserver is capable of submitting requests to a third-party database via secured access. Said system is capable of accepting oral commands from said user via a microphone installed on said mobile device. Said software application is capable of displaying a selected information and or multimedia programs on popup windows above locked or unlocked screen of said mobile device when said user in, at or close to said business, facility or entity. Said software application is capable of receiving an uniquely assigned digital code to a business; said uniquely assigned digital code is sent out by a signal emitter located within premises of said business, facility or entity; said software application sends said uniquely assigned digital code to its host webserver, said host webserver search any information and or multimedia programs posted and stored in its database by said business, facility or entity and sends back said information and or said multimedia programs to said software application. Said software application is capable of playing a special sound, ringtone or music to alert said user. Said system is capable of making said popup window disappeared from screen of said mobile device when said user walks away and or leaves said business, facility or entity from a close range, and or said assigned digital code signal weakened and replaced by another stronger assigned digital code for another business. Said system is capable of announcing said information via a speaker installed on said mobile device. Said software application is capable of searching and selecting and displaying information from any third party related to selected business, facility or entity posted on websites on screen of said mobile device. Said software application is capable of playing alive or recorded video programs broadcasted by said business, facility or entity. Said software application is capable of allowing user to make a phone call to said business, facility or entity via a touch button displayed on its screen on said mobile device, or via oral command. Said software application is capable of communicating with preconfigured webserver. Said hosting web server and or said onsite wireless communication hosting apparatus are capable of allowing said business, facility or entity to setup a defined physical range from their location to allow its information and or multimedia programs to be activated and give an alert to a user with said mobile device installed with said software application, further activate popup windows and display said information and or multimedia programs. Said software system is capable of playing alive or recorded video and audio announcement simultaneously. Said software system is capable of replacing and or switching between web Pages, windows, multimedia programs. Said hosting server, and or software application installed on said mobile device is capable of calculating effective physical parameter for a location or premises to activate related information and or multimedia programs by comparing and measuring said location to physical distances of other locations.

Said software application installed on said mobile device is capable of detecting, and further automatically connecting to and communicating with a hosting server setup for a region and or a country, and further receiving and updating commercials and information from said region and or said country. Said software application installed on said mobile device is capable of identifying a region and or a country and automatically adopting a. digital map of said region and or country. Said software application installed on said mobile device is capable of identifying a region and or a country and further optionally displaying and use language of said region and or said country.

Said software application is capable of configuring, and or being added to, and or embedded with a software application applied to a mobile device. Said software application coupled with said hosting server and or said onsite wireless communication hosting apparatus is capable of searching location of a specific object, service and or functional area based on map or floor-layout map. Said software application is capable of temporarily disabling ringtone, incoming phone reception and or audio function of said mobile device. Said information and or commercials of a third party may be inserted and displayed, and or played during an onsite alive or recorded video and or audio broadcasting. Said onsite onsite wireless communication hosting apparatus is capable of creating web or window applications, hosting and broadcasting audio and or video programs.

An automated onsite information search and multimedia method and system comprising steps with functions of a software application coupled with a digital map such as google map or GPS and internet connection installed on a mobile device such as cellphone is capable of communicating with a hosting webserver; said hosting webserver is capable of communicating with said software application and automatically updating location of said software application installed on said mobile device and sending information and or multimedia programs of business, facility or entity at location of said mobile; said hosting, webserver is capable of submitting requests to third-party databases via secured access; said software application is capable of accepting oral commands from said user via a microphone installed on said mobile device; said software application is capable of displaying selected information and or playing multimedia programs by said user on popup windows on screen of said mobile device when said user is in, at or close to said business, facility or entity; said system is capable of making said popup window disappeared from screen of said mobile device when said user walks away and or leaves said business, facility or entity from a close range; said software application is capable of playing a special sound, ringtone or music to get alert said user when said selected information and multimedia programs displayed or played on popup windows; said software application is capable of receiving an uniquely assigned digital code to a business; said uniquely assigned digital code is sent out by a signal emitter located within premises of said business; said software application sends said uniquely assigned digital code to its host webserver, said host webserver search information from said business from its database and sends back to said software application; said system is capable of announcing said selected information, alive or recorded speech or announcement via a speaker installed on said mobile device; said software application is capable of allowing user to make a phone call to said business, facility or entity via a touch button displayed on screen of said application on said mobile device, or via oral command; said software application is capable of communicating with an onsite wireless communication hosting apparatus; said onsite wireless communication apparatus is capable of composing and publishing information on web pages or windows, and or hosting multimedia data, audio and or video programs, and broadcasting said programs.

Disclosed is an onsite sales and commercial search method and system comprising: a software application installed on a mobile device such as a cellphone coupled to internet connection and a web-map such as google map or GPS (Global Position System); a hosting webserver is capable of communicating with said software application and automatically updating location of said software application and forwarding commercial with a business at location of said mobile device installed with software application; said software application installed on said mobile device is capable of communicating with said hosting webserver and automatically receiving and updating commercial and sales information posted by a business when a user with said mobile device is in, at or visibly close to said business; said mobile device is capable of automatically displaying and updating said commercial and sales information on a business-layout map according to its actual street location, and or actual floor layout of a business when a user of said mobile device is in, at or visibly close to said business. Said software application on said mobile device coupled with said web-map is capable of updating and sending accurate physical location of said mobile device to said hosting webserver. Said software application on said mobile device coupled to graphic user interface is capable of submitting various requests by user on new products and sales information posted online by business and shops within a visible range, postal address and or at location of said mobile device; and displays requested information sent back by said hosting webserver according to a business-layout map according to their actual street locations and or actual floor layouts within a radius range of said mobile device. Said software application on said mobile device may be deployed on a web browser installed to said mobile device. Said software application on said mobile device is capable of displaying floor layouts within structures of a building at a postal address. Said hosting webserver is capable of submitting requests to third-party databases via secured access. Said system is capable of accepting oral commands from said user via a microphone installed on said mobile device. Said software application is capable of displaying a selected business commercial on popup windows on screen of said mobile device when said user in, at or visibly close to said business. Said software application is capable of receiving an uniquely assigned digital code to a business; said uniquely assigned digital code is sent out by a signal emitter located within premises of said business; said software application sends said uniquely assigned digital code to its host webserver, said host webserver search commercials posted and stored in its database by said business and sends back said commercials to said software application. Said software application is capable of playing a special sound, ringtone or music to get attention from said user. Said system is capable of making said popup window disappeared from screen of said mobile device when said user walks away and or leaves said business from a visibly close range, and or said assigned digital code signal weakened and replaced by another stronger assigned digital code for another business. Said system is capable of announcing said selected commercial via a speaker installed on said mobile device. Said software application is capable of searching and selecting and displaying comments on selected business posted on websites on screen of said mobile device. Said software application is capable of playing recorded video clips with commercial of a business. Said software application is capable of allowing user to make a phone call to said business via a touch button displayed on screen of said mobile device, or via oral command. Said software application is capable of communicating with preconfigured webserver only. Said software system is capable of allowing said business to setup a defined physical range from its location to allow its commercial to be activated and get attention from a user with said mobile device installed with said software application, further activate popup windows and display its commercial. Said software system is capable of playing audio announcement or video clip simultaneously, before and or after displaying detailed commercial information on a web page. Said software system is capable of replacing and or switching between web pages, audio announcement and video clip recordings according to different sales and commercial requirements.

Described is an onsite sales and commercial search method and system comprising steps with functions of: a software application coupled with a digital map such as goggle map or GPS and internet connection installed on a mobile device such as cellphone is capable of communicating with a hosting webserver; said hosting webserver is capable of communicating with said software application and automatically updating location of said software application installed on said mobile device and sending commercial with business at location of said mobile; said commercial information on a business-layout map according to their actual street location and or actual floor layouts or interior structure when user with said mobile device installed with said software system is in, at or visibly close to said business; said hosting webserver is capable of submitting requests to third party databases via secured access; said system is capable of accepting oral commands from said user via a microphone installed on said mobile device; said software application is capable of displaying selected business commercial by said user on popup windows on screen of said mobile device when said user is in, at or visible close to said business; said software application is also capable of showing recorded video clips with commercial of said business on said popup window; said system is capable of making said popup window disappeared from screen of said mobile device when said user walks away and or leaves said business from a visibly close range; said software application is capable of playing a special sound, ringtone or music to get attention from said user when said selected business commercial displayed on popup windows; said software application is capable of receiving an uniquely assigned digital code to a business; said uniquely assigned digital code is sent out by a signal emitter located within premises of said business; said software application sends said uniquely assigned digital code to its host webserver, said host webserver search commercials from said business from its database and sends hack to said software application; said system is capable of announcing said selected commercial via a speaker installed on said mobile device; said software application is capable of searching and selecting and displaying comments on selected business posted on websites on screen of said mobile device; said software application is capable of allowing user to make a phone call to said business via a touch button displayed on screen of said mobile device, or via oral command.

Described is an onsite sales and commercial search method and system comprising: a software application installed on a mobile device such as a cellphone coupled to internet connection and a web-map such as google map or GPS (Global Position System); a hosting webserver is capable of communicating with said software application and automatically updating location of said software application and forwarding commercial with a business at location of said mobile device installed with software application; said software application installed on said mobile device is capable of communicating with said hosting webserver and automatically receiving and updating commercial and sales information posted by a business when a user with said mobile device is in, at or visibly close to said business; said mobile device is capable of automatically displaying and updating said commercial and sales information on a business-layout map according to its actual street location, and or actual floor layout of a business when a user of said mobile device is in, at or visibly close to said business. Said software application on said mobile device coupled with said web-map is capable of updating and sending accurate physical location of said mobile device to said hosting webserver. Said mobile device coupled to graphic user interface is capable of submitting various requests by user on new products and sales information posted online by business and shops within a visible range, postal address and or at location of said mobile device; and displays requested information sent back by said hosting webserver according to a business-layout map according to their actual street locations and or actual floor layouts within a radius range of said mobile device. Said mobile device may be deployed on a web browser installed to said mobile device. Said software application on said mobile device is capable of displaying floor layouts within structures of a building at a postal address. Said hosting webserver is capable of submitting requests to third-party databases via secured access. Said system is capable of accepting oral commands from said user via a microphone installed on said mobile device. Said software application is capable of displaying a selected business commercial on popup windows on screen of said mobile device when said user in, at or visibly close to said business. Said software application is capable of receiving an uniquely assigned digital code to a business; said uniquely assigned digital code is sent out by a signal emitter located within premises of said business; said software application sends said uniquely assigned digital code to its host webserver, said host webserver search commercials posted and stored in its database by said business and sends back said commercials to said software application. Said software application is capable of playing a special sound, ringtone or music to get attention from said user. Said system is capable of making said popup window disappeared from screen of said mobile device when said user walks away and or leaves said business from a visibly close range, and or said assigned digital code signal weakened and replaced by another stronger assigned digital code for another business. Said system is capable of announcing said selected commercial via a speaker installed on said mobile device. Said software application is capable of searching and selecting and displaying comments on selected business posted on websites on screen of said mobile device. Said software application is capable of playing recorded video clips with commercial of a business. Said software application is capable of allowing user to make a phone call to said business via a touch button displayed on screen of said mobile device, or via oral command. Said software application is capable of communicating with preconfigured webserver only. Said software system is capable of allowing said business to setup a defined physical range from its location to allow its commercial to be activated and get attention from a user with said mobile device installed with said software application, further activate popup windows and display its commercial.

Described is an onsite sales and commercial search method and system comprising steps with functions of: a software application coupled with a digital map such as google map or GPS and internet connection installed on a mobile device such as cellphone is capable of communicating with a hosting webserver; said hosting webserver is capable of communicating with said software application and automatically updating location of said software application installed on said mobile device and sending commercial with business at location of said mobile; said commercial information on a business-layout map according to their actual street location and or actual floor layouts when user with said mobile device installed with said software system is in, at or visibly close to said business; said hosting webserver is capable of submitting requests to third party databases via secured access; said system is capable of accepting oral commands from said user via a microphone installed on said mobile device; said software application is capable of displaying selected business commercial by said user on popup windows on screen of said mobile device when said user is in, at or visible close to said business; said software application is also capable of showing recorded video clips with commercial of said business on said popup window; said system is capable of making said popup window disappeared from screen of said mobile device when said user walks away and or leaves said business from a visibly close range; said software application is capable of playing a special sound, ringtone or music to get attention from said user when said selected business commercial displayed on popup windows; said software application is capable of receiving an uniquely assigned digital code to a business; said uniquely assigned digital code is sent out by a signal emitter located within premises of said business; said software application sends said uniquely assigned digital code to its host webserver, said host webserver search commercials from said business from its database and sends back to said software application; said system is capable of announcing said selected commercial via a speaker installed on said mobile device; said software application is capable of searching and selecting and displaying comments on selected business posted on websites on screen of said mobile device; said software application is capable of allowing user to make a phone call to said business via a touch button displayed on screen of said mobile device, or via oral command.

Disclosed is a geo-based information provision, search and access system comprising: a software system is configured to allow location owners to submit and post information recorded and live multimedia data via secured accounts over an internet website or UGI (User Graphic Interface) run and administrated by said software system; said information, and recorded and live multimedia data provided by location owners are directly accessible via locations marked on a digital map displayed over end-user interfaces of said internet website; a software application installed on mobile device is configured to communicate with said software system; and said software system is configured to monitor location of said mobile device via a geographical location tracking device; and said mobile device is configured to automatically receive and access said information, recorded and live multimedia data provided by location owners forwarded by said software system via wireless network when said users of said mobile device are in or within a range of said location. Said software system is configured to provide location owners with functions and allow said location owners to select appropriate functions to post information, recorded and live multimedia data on said website. Said software system is configured to allow said location owners to select sequences of information, recorded and live multimedia data; and is configured to automatically display and play the entire information of, recorded and live multimedia programs step-by-step automatically by sequences setup by said location owners or by said system. Said software system is configured to allow location owners to select entire or partial information and recorded and live multimedia data displayed or played via said website and or via said application installed on said mobile device. Said software system is configured to show accurate date and time on latest information updated by location owner when internet users move curser of a computer on screen of a monitor over a location marked on said digital map on said internet website run and administrated by said software system. Said software system is configured to show concise information when a location is in the process of broadcasting live audio and video programs as internet users move curser of a computer on screen of a monitor over a location marked on said digital map on said Internet website run and administrated by said software system. Said software system is configured to display and show information, recorded and live multimedia programs automatically step-by-step setup by owner of a location when said internet users click on a location marked on said digital map on said internet website run and administrated by said software system. Said software system is configured to allow location owners to setup a password and request internet and mobile device users to enter password to obtain access on information, data, and recorded and live multimedia programs when internet users click on a location on said digital map, or mobile device users are in or within a range of said location. Said software system is configured to reserve a partial screen area when displaying said digital map on said internet website run and administrated by said system; said partial screen area is configured to display information and links of selected online business websites with no physical locations opening to the general public, and within defined searching category submitted via said website to said system by said internet users. Said software system is configured to provide functions and procedures and allow location owners and sub-location owners within physical parameters of said location to create and publish sub-locations marked on said digital map, interior structure of said location or floor layout within physical range of said location, and further directly provide information and data access to internet and mobile device users.

Disclosed is a geo-based information provision, search and access method comprising steps of: allowing location owners to submit and posting information, recorded and live multimedia data via secured accounts over an internet website or UGI (User Graphic interface); arranging and step-by-step sequentially showing information, recorded and live multimedia data automatically; showing recorded and live multimedia directly via locations marked on a digital map over internet; and on mobile device, installed with geo position tracking device, via wireless network when user of said mobile device is in or within a range of said location; reserving a partial screen area and displaying information and links of selected online business websites with no physical locations opening to the general public, and within defined searching category submitted via by said users; allowing location owners and sub-location owners within said location to create sub-locations within physical parameters of said locations; publishing and marking their sub-locations on said digital map or floor layout within physical range of said location, and further directly providing information access to internet or mobile device users. Disclosed is a geo-based information provision, search and access system is configured to: allow location owners to submit and posting information, recorded and live multimedia data via secured accounts over an internet website or UGI (User Graphic Interface); arrange and step-by-step sequentially showing information, recorded and live multimedia data automatically; show recorded and live multimedia directly via locations marked on a digital map over internet; and on mobile device, installed with geo position tracking device, via wireless network when user of said mobile device is in or within a range of said location; reserve a partial screen area and displaying information and links of selected online business websites with no physical locations opening to the general public, and within defined searching category submitted via by said users; allow location owners and sub-location owners within said location to create sub-locations within physical parameters of said locations; publish and mark their sub-locations on said digital map or floor layout within physical range of said location, and further directly provide information access to internet or mobile device users. Users of the system may communicate with one another, or one or more user groups to share information via features and functions provided by the system.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define the described systems. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

Although the embodiments of the present technology have been illustrated in the accompanying drawings and described in the foregoing detailed description, it is to be understood that the present technology is not to be limited to just the embodiments disclosed, but that the technology described herein is capable of numerous rearrangements, modifications and substitutions without departing from the scope of the claims hereafter. The claims as follows are intended to include all modifications and alterations insofar as they come within the scope of the claims or the equivalent thereof.

The invention claimed is:

1. An automated onsite information search and multimedia system for independent short-range wireless broadcasting comprising:
    an onsite wireless communication apparatus comprising:
        a first short range wireless transceiver operatively generating a wireless signal to be received by users of mobile devices;
        an input device for receiving input from a user of the onsite wireless communication apparatus; and
        a processor storing computer executable software in a memory, wherein execution of the software generates a graphical user interface that prompts a user of the onsite wireless communication apparatus to specify media content to be uploaded to the memory; and
    a mobile application operatively installed on a user mobile device and in operative communication with the onsite wireless communication apparatus via a second short range wireless transceiver when the user device is within a coverage area of the first short range wireless transceiver; and
    wherein the onsite wireless communication apparatus directly transmits an authorization code to the mobile application via the first short range wireless transceiver and the mobile application determines whether to authorize the onsite wireless communication apparatus in response to comparing the authorization code to a set of known access codes stored in a memory of the mobile device; and
    wherein once authorized, the onsite wireless communication apparatus directly communicates with the mobile application via the first and second short range wireless transceivers without requiring a connection to the internet or other networks.

2. The automated onsite information search and multimedia system of claim 1,
    wherein the mobile application determines a permission type for the onsite wireless communication apparatus based on the comparison of the authorization code to the set of known access codes.

3. The automated onsite information search and multimedia system of claim 1,
    wherein the mobile application operatively receives the set of known access codes from a remote access point.

4. The automated onsite information search and multimedia system of claim 1,
    wherein the onsite wireless communication apparatus receives the media content and stores the media content in the memory.

5. The automated onsite information search and multimedia system of claim 4,
    wherein the onsite wireless communication apparatus sends the media content to the user device when the user device is within the coverage area of the short-range wireless transceiver.

6. The automated onsite information search and multimedia system of claim 1,
    wherein the onsite wireless communication apparatus further comprises an input port operatively receiving a connection to at least one of audio equipment or video equipment.

7. The automated onsite information search and multimedia system of claim 6,
    wherein the onsite wireless communication apparatus transmits a live broadcast of the media content to the user device when the user device is within the coverage area of the short range wireless transceiver.

8. The automated onsite information search and multimedia system of claim 1, wherein the graphical user interface prompts the user of the onsite wireless communication apparatus to enter sequentially arranged media content.

9. The automated onsite information search and multimedia system of claim 8,
    wherein the onsite wireless communication apparatus broadcasts the media content according to the sequential arrangement specified by the user.

10. The automated onsite information search and multimedia system of claim 1, wherein the onsite wireless communication apparatus comprises at least one wireless signal-extender configured to expand signal-covering area.

11. The automated onsite information search and multimedia system of claim 1,
    wherein the onsite wireless communication apparatus operatively connects to the interne or another network to upload data to or download data from a remote server, wherein the remote server stores the data for the owner of the onsite wireless communication apparatus.

12. The automated onsite information search and multimedia system of claim 11, wherein the remote server provides a website from the system with a location over on a digital map and allows users to access location data from said remote server or data from a third party server via the remote server.

13. The automated onsite information search and multimedia system of claim 11,
    wherein the remote server: operatively communicates with third party servers via secured access; determines if requested data by a user of the website or the mobile application is available within the remote sever, and sends the requested data to the user if it is available; and
    if the requested data is not available in the remote server, determines if the requested data is stored in the third party server and receives the requested data from the third party server through the secured access, and forwards the requested data to the user.

14. The automated onsite information search and multimedia system of claim 11,
    wherein the remote server comprises a storage media for the user, and provides, independent of the onsite wireless communication apparatus, at least one of a website or downloadable software, and operatively allows the user to enter, upload and update location media contents data.

15. The automated onsite information search and multimedia system of claim 11,
    wherein the onsite wireless communication apparatus operatively communicates with a second onsite wireless communication apparatus through at least one of the: remoter server, or through a direct connection between the onsite wireless communication apparatus and the second when the second onsite wireless communication apparatus is within the coverage area of the short range wireless transceiver.

16. The automated onsite information search and multimedia system of claim 11,
wherein the remote server enables users of the system to communicate with one or more other users, or one or more groups of users via social media features and functions of the system.

17. The automatic onsite information search and multimedia system of claim 16,
wherein said communication comprises at least one of photo sharing, text, recorded or live audio, and recorded or live video.

18. The automated onsite information search and multimedia system of claim 16,
wherein the remote server enables users to connect to other users for private communications, or organize groups to share information based on common interests or a location.

19. An automated onsite information search and multimedia system comprising:
software application operatively installed on a mobile device associated with a user, the mobile device including a first short range wireless transceiver;
an onsite wireless communication apparatus comprising a second short range wireless transceiver having a coverage area, a processor, a memory that operatively stores media content created or uploaded by an owner of the onsite wireless communication apparatus, and a display that renders a graphical user interface;
wherein the onsite wireless communication apparatus directly and wirelessly transmits
the media content to the mobile device running the software application without connecting to the internet or a cellular network; and
wherein the onsite wireless communication apparatus transfers an unique identification code to the mobile device, and the software application operatively compares the unique identification code to a set of authorization codes stored on the mobile device to determine whether the onsite wireless communication apparatus is an authorized device.

20. The automated onsite information search and multimedia system of claim 19,
wherein the software application operatively displays information or multimedia programs on popup windows above a locked or unlocked screen of the mobile device when said user is within the coverage area of the wireless transceiver.

21. The automated onsite information search and multimedia system of claim 19,
wherein the software application queries the onsite wireless communication apparatus for at least one of merchandise, a service or a functional area, or floor-layout map.

22. The automated onsite information search and multimedia system of claim 19,
wherein the software application operatively instructs the mobile device to generate an audible alert in response to receiving the media content.

23. The automated onsite information search and multimedia system of claim 19,
wherein the graphical user interface instructs a user to create and upload the media content.

24. The automated onsite information search and multimedia system of claim 19,
wherein at least one of the software application or the onsite wireless communication apparatus operatively monitors a timespan of connectivity between the mobile device and the onsite wireless communication apparatus.

25. The automated onsite information search and multimedia system of claim 24,
wherein at least one of the software application or the onsite wireless communication apparatus determines whether the mobile device is associated with a passerby or a customer based on the monitored timespan.

26. The automated onsite information search and multimedia system of claim 24,
wherein the graphical user interface receives a defined coverage area in which, when the mobile device is within the coverage area, the software application receives the media content on the mobile device.

27. The automated onsite information search and multimedia system of claim 26,
wherein the software application operatively determines whether the mobile device is within the coverage area.

28. The automated onsite information search and multimedia system of claim 26,
wherein the onsite wireless communication apparatus operatively adjusts a signal's broadcasting range and parameters of output signals by scaling up or down strength of the output signals at least as a function of the coverage area.

* * * * *